United States Patent
Kubo et al.

(10) Patent No.: US 8,700,478 B2
(45) Date of Patent: Apr. 15, 2014

(54) COMPUTER-READABLE STORAGE MEDIUM, INFORMATION PROCESSING APPARATUS, INFORMATION PROCESSING SYSTEM, AND INFORMATION PROCESSING METHOD

(75) Inventors: Kenta Kubo, Kyoto (JP); Yusuke Akifusa, Kyoto (JP); Ryutaro Takahashi, Kyoto (JP); Kouichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 94 days.

(21) Appl. No.: 12/940,426

(22) Filed: Nov. 5, 2010

(65) Prior Publication Data

US 2011/0295709 A1     Dec. 1, 2011

(30) Foreign Application Priority Data

May 31, 2010    (JP) ................................ 2010-125075

(51) Int. Cl.
     *G06Q 30/00*      (2012.01)
(52) U.S. Cl.
     USPC ........................................................ 705/26.1
(58) Field of Classification Search
     USPC .................................................. 705/26–27.2
     See application file for complete search history.

(56) References Cited

U.S. PATENT DOCUMENTS

| | | | |
|---|---|---|---|
| 5,396,225 A | 3/1995 | Okada et al. | |
| 5,618,045 A | 4/1997 | Kagan et al. | |
| 5,666,293 A | 9/1997 | Metz et al. | |
| 5,732,275 A | 3/1998 | Kullick et al. | |
| 6,438,573 B1 | 8/2002 | Nilsen | |
| 6,733,382 B2 | 5/2004 | Oe et al. | |
| 6,736,727 B1 | 5/2004 | Doi et al. | |
| 7,054,831 B2 * | 5/2006 | Koenig | 705/14.5 |
| 7,114,090 B2 | 9/2006 | Kardach et al. | |
| 7,290,072 B2 | 10/2007 | Quraishi et al. | |
| 7,346,708 B2 | 3/2008 | Minamisawa | |
| 7,457,410 B2 | 11/2008 | Yamauchi et al. | |
| 7,565,653 B2 | 7/2009 | Inoue et al. | |
| 7,620,027 B2 | 11/2009 | Igarashi et al. | |
| 7,704,147 B2 | 4/2010 | Quraishi et al. | |

(Continued)

FOREIGN PATENT DOCUMENTS

| | | |
|---|---|---|
| EP | 1 493 474 | 1/2005 |
| EP | 1 513 066 | 3/2005 |

(Continued)

OTHER PUBLICATIONS

Miki, "Oideyo Doubutsu No Mori Kanpeki Guidebook", First Edition, Enterbrain, Inc., Hamamura Kouichi, Jan. 9, 2006 (partial English-language translation), 6 pages.

(Continued)

*Primary Examiner* — Jason Dunham
*Assistant Examiner* — Ethan D Civan
(74) *Attorney, Agent, or Firm* — Nixon & Vanderhye, P.C.

(57) ABSTRACT

A game apparatus executes an application loaded from a storage section, and generates an application information frame that contains most-recently-used app ID information that is identification information of the executed application. Then, the game apparatus transmits the application information frame to another game apparatus. The game apparatus receives, from the other game apparatus, most-recently-used app ID information that identifies an application executed by the other game apparatus. The game apparatus displays the received most-recently-used app ID information.

31 Claims, 21 Drawing Sheets

(56) References Cited

U.S. PATENT DOCUMENTS

| | | | |
|---|---|---|---|
| 7,725,078 B2 | 5/2010 | Kuwahara et al. |
| 7,729,661 B2 | 6/2010 | Tanaka et al. |
| 7,794,328 B2 | 9/2010 | Horigome |
| 7,801,818 B2 | 9/2010 | Tsukazaki et al. |
| 7,811,171 B2 | 10/2010 | Mitsuyoshi et al. |
| 7,813,300 B2 | 10/2010 | Takayama et al. |
| 7,819,750 B2 | 10/2010 | Lam et al. |
| 7,854,657 B2 | 12/2010 | Shiraiwa |
| 7,862,433 B2 | 1/2011 | Sato et al. |
| 7,901,293 B2 | 3/2011 | Oe |
| 7,929,911 B2 | 4/2011 | Tanaka et al. |
| 7,934,995 B2 | 5/2011 | Suzuki |
| 8,052,528 B2 | 11/2011 | Shiraiwa |
| 8,075,405 B2 | 12/2011 | Sasaki et al. |
| 8,078,160 B2 | 12/2011 | Quinn |
| 8,185,165 B2 | 5/2012 | Beninghaus et al. |
| 8,229,962 B1 | 7/2012 | Cavalancia, II |
| 8,261,258 B1 | 9/2012 | Jianu et al. |
| 8,433,375 B2 | 4/2013 | Yamazaki et al. |
| 8,505,008 B2 | 8/2013 | Yamazaki et al. |
| 2001/0003714 A1 | 6/2001 | Takata et al. |
| 2001/0048744 A1 | 12/2001 | Kimura et al. |
| 2002/0016166 A1 | 2/2002 | Uchida et al. |
| 2002/0065137 A1 | 5/2002 | Tonomura |
| 2002/0083160 A1 | 6/2002 | Middleton |
| 2003/0033413 A1 | 2/2003 | Wilson, Jr. et al. |
| 2003/0126218 A1 | 7/2003 | Sakonsaku |
| 2004/0082383 A1 | 4/2004 | Muncaster et al. |
| 2004/0122931 A1 | 6/2004 | Rowland et al. |
| 2004/0127288 A1 | 7/2004 | Furuhashi et al. |
| 2004/0151126 A1 | 8/2004 | Matsubara |
| 2004/0224769 A1 | 11/2004 | Hansen et al. |
| 2004/0259642 A1 | 12/2004 | Tanaka et al. |
| 2005/0070327 A1 | 3/2005 | Watanabe |
| 2005/0073764 A1 | 4/2005 | Ogawa et al. |
| 2005/0282639 A1 | 12/2005 | Tanaka et al. |
| 2006/0068702 A1 | 3/2006 | Miwa et al. |
| 2006/0106963 A1 | 5/2006 | Sasaki et al. |
| 2006/0166739 A1 | 7/2006 | Lin |
| 2006/0168574 A1 | 7/2006 | Giannini et al. |
| 2006/0234631 A1 | 10/2006 | Dieguez |
| 2006/0247059 A1 | 11/2006 | Nogami et al. |
| 2006/0282518 A1 | 12/2006 | Karaoguz et al. |
| 2006/0282834 A1 | 12/2006 | Cheng et al. |
| 2007/0078004 A1 | 4/2007 | Suzuki et al. |
| 2007/0105623 A1 | 5/2007 | Tanaka et al. |
| 2007/0118587 A1 | 5/2007 | Ishikawa et al. |
| 2007/0121534 A1 | 5/2007 | James et al. |
| 2007/0123168 A1 | 5/2007 | Takehara et al. |
| 2007/0136817 A1 | 6/2007 | Nguyen |
| 2007/0149183 A1 | 6/2007 | Dunko et al. |
| 2007/0174471 A1 | 7/2007 | Van Rossum |
| 2007/0203969 A1 | 8/2007 | Wakasa et al. |
| 2007/0213975 A1 | 9/2007 | Shimoda et al. |
| 2007/0232310 A1 | 10/2007 | Schiff et al. |
| 2008/0119281 A1 | 5/2008 | Hirose et al. |
| 2008/0123582 A1 | 5/2008 | Maekawa |
| 2008/0139310 A1* | 6/2008 | Kando et al. .......... 463/33 |
| 2008/0209071 A1 | 8/2008 | Kubota |
| 2009/0037526 A1 | 2/2009 | Elliott et al. |
| 2009/0058639 A1 | 3/2009 | Tanaka et al. |
| 2009/0061870 A1 | 3/2009 | Finkelstein et al. |
| 2009/0093310 A1 | 4/2009 | Tanaka et al. |
| 2009/0124393 A1 | 5/2009 | Tanaka et al. |
| 2009/0137321 A1 | 5/2009 | Katsume et al. |
| 2009/0143140 A1 | 6/2009 | Kitahara |
| 2009/0158430 A1 | 6/2009 | Borders |
| 2009/0186603 A1 | 7/2009 | Usami et al. |
| 2009/0193365 A1 | 7/2009 | Sugiura |
| 2009/0217307 A1 | 8/2009 | Ooe |
| 2009/0253518 A1 | 10/2009 | Sasaki et al. |
| 2009/0310594 A1* | 12/2009 | Nakata ............ 370/350 |
| 2010/0111057 A1 | 5/2010 | Nakamura et al. |
| 2010/0130254 A1 | 5/2010 | Kamada et al. |
| 2010/0167697 A1 | 7/2010 | Ishikawa et al. |
| 2010/0312817 A1 | 12/2010 | Steakley |
| 2010/0325235 A1 | 12/2010 | Konno et al. |
| 2011/0045910 A1 | 2/2011 | McKenna et al. |
| 2011/0060825 A1 | 3/2011 | Ooe et al. |
| 2011/0070950 A1 | 3/2011 | Tanaka et al. |
| 2011/0143840 A1 | 6/2011 | Sotoike et al. |
| 2011/0176455 A1 | 7/2011 | Matsunada |
| 2011/0205953 A1 | 8/2011 | Kuwahara et al. |
| 2011/0231559 A1 | 9/2011 | Yamaguchi |
| 2011/0292033 A1 | 12/2011 | Umezu et al. |
| 2011/0295709 A1 | 12/2011 | Kubo et al. |
| 2011/0306294 A1 | 12/2011 | Yamazaki et al. |
| 2011/0307554 A1 | 12/2011 | Konno et al. |
| 2011/0307884 A1 | 12/2011 | Wabe |
| 2011/0307892 A1 | 12/2011 | Yamazaki et al. |
| 2012/0010000 A1 | 1/2012 | Masuda et al. |
| 2012/0011256 A1 | 1/2012 | Masuda et al. |
| 2012/0021703 A1 | 1/2012 | Yamazaki et al. |
| 2012/0054297 A1 | 3/2012 | Konno et al. |
| 2012/0071242 A1 | 3/2012 | Fujiwara et al. |

FOREIGN PATENT DOCUMENTS

| | | |
|---|---|---|
| EP | 1 810 732 | 7/2007 |
| EP | 1 872 838 | 1/2008 |
| EP | 2 135 650 | 12/2009 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |
| JP | 2002-102530 | 4/2002 |
| JP | 2002-159739 | 6/2002 |
| JP | 2002-253866 | 9/2002 |
| JP | 2003-023661 | 1/2003 |
| JP | 2003-050771 | 2/2003 |
| JP | 2003-196217 | 7/2003 |
| JP | 2004-057515 | 2/2004 |
| JP | 2004-329948 | 11/2004 |
| JP | 2004-348203 | 12/2004 |
| JP | 2005-028103 | 2/2005 |
| JP | 2005-242399 | 9/2005 |
| JP | 2005-266160 | 9/2005 |
| JP | 2006-005630 | 1/2006 |
| JP | 2006-101474 | 4/2006 |
| JP | 2006-228113 | 8/2006 |
| JP | 2007-088900 | 4/2007 |
| JP | 2007-330642 | 12/2007 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-160303 | 7/2008 |
| JP | 2008-206800 | 9/2008 |
| JP | 2009-026178 | 2/2009 |
| JP | 2009-147828 | 7/2009 |
| JP | 2010-022704 | 2/2010 |
| JP | 2010-028171 | 2/2010 |
| WO | 2005/111815 | 11/2005 |
| WO | 2009/048473 | 4/2009 |
| WO | 2010/010645 | 1/2010 |

OTHER PUBLICATIONS

Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.

Dragon Quest Monsters Joker 2, Nintendo Dream, Mainichi Communications, Inc., Jul. 1, 2010, vol. 15, No. 7, Serial No. 195, pp. 52-59, with a partial English translation, 12 pages.

Game Broadway STAGE27, Gamaga, Softbank Creative Corp., Jun. 1, 2010, vol. 27, No. 6, Serial No. 475, pp. 36-37, with a partial English translation, 6 pages.

English-language machine translation of JP 11-207031.
English-language machine translation of JP 2006-005630.
English-language machine translation of JP 2006-228113.
English-language machine translation of JP 2007-330642.

(56) References Cited

OTHER PUBLICATIONS

English-language machine translation of JP 2008-113259.
English-language machine translation of JP 2008-160303.
English-language machine translation of JP 2009-026178.
Dissidia Final Fantasy Ultimania, Japan, Square Enix Co., Ltd., Feb. 19, 2009, First Edition, p. 502-503 and partial English-language translation thereof.
English-language machine translation of JP 2002-102530.
English-language machine translation of JP 2000-167233.
English-language machine translation of JP 2010-022704.
Konno et al., U.S. Appl. No. 12/816,672, filed Jun. 16, 2010.
Ooe et al., U.S. Appl. No. 12/871,243, filed Aug. 30, 2010.
Yamazaki et al., U.S. Appl. No. 12/948,050, filed Nov. 17, 2010.
Yamazaki et al., U.S. Appl. No. 12/948,371, filed Nov. 17, 2010.
Fujiwara et al., U.S. Appl. No. 12/969,855, filed Dec. 16, 2010.
Wabe et al., U.S. Appl. No. 13/027,723, filed Feb. 15, 2011.
Konno et al., U.S. Appl. No. 13/101,811, filed May 5, 2011.
Fujiwara et al., U.S. Appl. No. 13/111,033, filed May 19, 2011.
Konno et al., U.S. Appl. No. 13/251,204, filed Oct. 1, 2011.
Yamazaki et al., U.S. Appl. No. 13/251,205, filed Oct. 1, 2011.

\* cited by examiner

CONNECTION REQUEST FRAME

CONNECTION RESPONSE FRAME

APPLICATION INFORMATION FRAME

F I G. 2 1
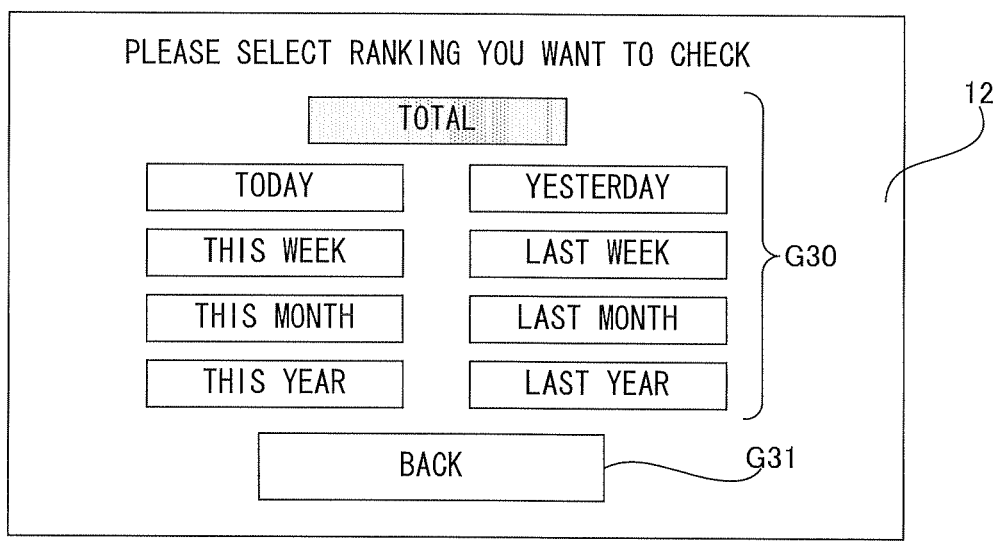

COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-125075, filed May 31, 2010, is incorporated herein by reference.

BACKGROUND OF THE INVENTION

1. Field of the Invention

The present invention relates to a computer-readable storage medium, an information processing apparatus, an information processing system, and an information processing method. More particularly, the present invention relates to a computer-readable storage medium, an information processing apparatus, an information processing system, and an information processing method for obtaining information about content data executed by another information processing apparatus.

2. Description of the Background Art

There are existing conventional techniques for cumulatively storing, as a user's usage history of web contents, the user's history of downloading the web contents to the user's terminal apparatus. For example, Japanese Laid-open Patent Publication No. 2004-348203 discloses a system in which when a server receives from a user a request to purchase content data, the server transmits conditions of use for the content data to a terminal apparatus of the user, and also, sets the ID of the terminal apparatus which has made the request, the ID of the content data, the price of the content data, and the like in a table. In this manner, the server can collect, in the table, records of purchases of such content data.

However, in such a conventional system, records of purchases of content data that are collected by the server are not intended to be distributed to terminal apparatuses. Therefore, terminal apparatus users are unable to obtain the records of purchases of content data which are cumulatively collected by the server. Even if such a conventional server is configured to distribute records of purchases of content data to a user terminal apparatus in response to a request from the user terminal apparatus for distribution of the records of purchases of content data, the server distributes information that shows records of purchases of content data about all the terminal apparatuses that have made purchases of content data from the server. This makes it difficult for a user of a terminal apparatus to know, about a specific terminal apparatus that is associated with the terminal apparatus of the user, a record of purchases of content data and a usage status of the purchased content data.

SUMMARY OF THE INVENTION

Therefore, an object of the present invention is to provide a computer-readable storage medium, an information processing apparatus, an information processing system, and an information processing method for allowing a terminal apparatus to obtain information about content data of a specific terminal apparatus that is closely related to the terminal apparatus.

In order to achieve the above-mentioned object, in a first aspect of the present invention, a program stored in a computer-readable storage medium causes a computer of an information processing apparatus that includes a storage section for storing content data, to act as content data execution means, transmission data generation means, first transmitting means, first receiving means, and first output means. The content data execution means executes the content data. The transmission data generation means generates transmission data that contains identification information of content data that is being executed by the content data execution means, or of content data that has been executed by the content data execution means. The first transmitting means transmits the transmission data to another information processing apparatus. The first receiving means receives, from said another information processing apparatus, identification information of content data executed by said another information processing apparatus. The first output means outputs the identification information received by the first receiving means.

According to the above configuration, the information processing apparatus transmits/receives identification information of content data to/from a specific information processing apparatus that is a communication recipient of the information processing apparatus. In this manner, the information processing apparatus obtains, and allows its user to know, the status of content data execution by the specific information processing apparatus. Also, the information processing apparatus can provide the status of content data execution by the information processing apparatus to the user of the specific information processing apparatus. Note that the term "content data" herein refers to image data, video data, audio data, an application, and the like. The "storage section" may be incorporated into the information processing apparatus, or alternatively, provided as a detachable external storage section. The term "execution" herein refers not only to execution of an application but also to display of image data as well as reproduction of audio data or video data. The term "output" herein includes audio output, image display, and the like, and is not limited to an output via an output unit (display, speaker, etc.) of the information processing apparatus but includes an output via an external output unit. The computer-readable storage medium herein may be, but not limited to, a volatile memory (e.g., RAM), nonvolatile memory (e.g., CD-ROM, DVD-ROM, ROM, flash memory, or memory card), or the like.

In a second aspect of the present invention, according to the program stored in the computer-readable storage medium, the first transmitting means automatically performs a process for transmitting the transmission data, and the first receiving means automatically performs a process for receiving the identification information of the content data executed by said another information processing apparatus. This eliminates the necessity for the user of the information processing apparatus to perform operations for transmitting/receiving identification information to/from another information processing apparatus. Since the information processing apparatus performs the transmission/reception of identification information while the user is unaware of it, the user is unexpectedly informed of identification information that is obtained by the information processing apparatus. In this manner, unexpected amusement can be provided to the user.

In a third aspect of the present invention, according to the program stored in the computer-readable storage medium, the first transmitting means automatically repeats the process for transmitting the transmission data, and the first receiving means automatically repeats the process for receiving the identification information of the content data executed by said another information processing apparatus. According to this configuration, the transmission/reception of identification information is automatically repeated while the user is unaware of it. Thus, the information processing apparatus automatically repeats the transmission/reception of new identification information to/from another information processing apparatus, regardless of the user's intention. In this manner, unexpected amusement can be provided to the user.

In a fourth aspect of the present invention, the information processing apparatus is a handheld terminal apparatus, and the program stored in the computer-readable storage medium further causes the computer to act as communication establishing means. The communication establishing means repeatedly searches, by short-distance wireless communication, for another information processing apparatus that is to become a communication recipient of the information processing apparatus and that is present within a distance range from the information processing apparatus, the distance range allowing the information processing apparatus to perform the short-distance wireless communication with said another information processing apparatus, and the communication establishing means automatically establishes a connection of the short-distance wireless communication with said another information processing apparatus. The first transmitting means automatically transmits, by the short-distance wireless communication, the transmission data to said another information processing apparatus, which is the communication recipient. The first receiving means automatically receives, by the short-distance wireless communication, the identification information from said another information processing apparatus, which is the communication recipient.

According to the above configuration, the information processing apparatus transmits/receives identification information to/from another information processing apparatus by short-distance wireless communication. Thus, the user of the information processing apparatus can know the status of usage of content data by the user of said another information processing apparatus, which is located within a short distance from the information processing apparatus. Since the information processing apparatus is a handheld terminal apparatus, the user carries it. Therefore, the user can obtain, wherever the user goes, identification information of content data executed by another information processing apparatus that is located within a short distance from the user's information processing apparatus. This allows the user to know the status of usage of content data by another user whose area of activities is similar to that of the user. For example, if the user carrying the information processing apparatus likes baseball and is in a ballpark, then the user can obtain, by using the information processing apparatus, identification information that indicates content data used by another user in the same ballpark, who also likes baseball. Identification information of content data used by other users can be obtained in such a manner, and provided to the user of the information processing apparatus in a manner customized based on the user's area of activities.

In a fifth aspect of the present invention, the program stored in the computer-readable storage medium further causes the computer to act as connection request transmitting means, connection request receiving means, connection response transmitting means, and connection response receiving means. The connection request transmitting means automatically transmits a connection request at a predetermined timing to said another information processing apparatus. The connection request receiving means receives a connection request from said another information processing apparatus. The connection response transmitting means transmits a connection response to said another information processing apparatus when the connection request transmitted from said another information processing apparatus has been received. The connection response receiving means receives a connection response transmitted from said another information processing apparatus. The first transmitting means transmits the transmission data to said another information processing apparatus when the connection response transmitting means has transmitted the connection response to said another information processing apparatus or when the connection response receiving means has received the connection response from said another information processing apparatus.

According to the above configuration, the information processing apparatus automatically establishes communication with another information processing apparatus, and transmits/receives identification information to/from said another information processing apparatus, accordingly. In this manner, the information processing apparatus transmits/receives identification information to/from said another information processing apparatuses while the user of the information processing apparatus is unaware of it. Accordingly, identification information can be provided to the user in a manner to give the user unexpected amusement. Since the transmission/reception of identification information is performed after the communication is established, the information processing apparatus can transmit/receive identification information to/from said another information processing apparatus without failure.

In a sixth aspect of the present invention, according to the program stored in the computer-readable storage medium, the first transmitting means transmits the transmission data generated by the transmission data generation means, when transmission data transmitted from said another information processing apparatus has been received. According to this configuration, the information processing apparatus performs both transmission/reception of identification information to/from another information processing apparatus when communication therewith is established. In this manner, the information processing apparatus can transmit/receive identification information to/from said another information processing apparatus without failure by a limited number of times of communication.

In a seventh aspect of the present invention, according to the program stored in the computer-readable storage medium, the first transmitting means transmits the transmission data to said another information processing apparatus by short-distance wireless communication, and the first receiving means receives the identification information from said another information processing apparatus by the short-distance wireless communication. According to this configuration, the information processing apparatus transmits/receives identification information to/from another information processing apparatus that is located within such a short distance from the information processing apparatus as to allow the information processing apparatus to perform the short-distance wireless communication with said another information processing apparatus. In this manner, the user of the information processing apparatus can know the status of usage of content data by the user of said another information processing apparatus, which is located within the short distance from the information processing apparatus.

In an eighth aspect of the present invention, the program stored in the computer-readable storage medium further causes the computer of the information processing apparatus to act as transmission data update means. The storage section is configured to store the transmission data up to a predetermined amount. The first transmitting means transmits the transmission data stored in the storage section to said another game apparatus. The transmission data update means updates data in the storage section when the transmission data generation means has newly generated the transmission data, such that the predetermined amount of the transmission data stored in the storage section, which contains the newly generated transmission data, are arranged in reverse chronological order of generation.

According to the above configuration, the predetermined amount of the transmission data is stored in the storage section in reverse chronological order of generation. The information processing apparatus transmits the transmission data to another information processing apparatus. Accordingly, the information processing apparatus and said another information processing apparatus transmit to/receive from each other identification information of content data newly executed by the information processing apparatus and said another information processing apparatus. This allows the user of the information processing apparatus to obtain information about content data that has recently been used by the user of said another information processing apparatus.

In a ninth aspect of the present invention, according to the program stored in the computer-readable storage medium, the first receiving means stores the received identification information of the content data in the storage section as cumulative data. This configuration allows the information processing apparatus to perform a predetermined process such as a counting process or statistical process based on the cumulative data, and to output a result of the process to the user.

In a tenth aspect of the present invention, according to the program stored in the computer-readable storage medium, the first output means outputs information that is based on the number of pieces of identification information contained in the cumulative data. This configuration allows the user to obtain information that is based on the number of pieces of identification information, such as the total number of pieces of identification information contained in the cumulative data or the total number of pieces of identification information received from a specific information processing apparatus.

In an eleventh aspect of the present invention, the program stored in the computer-readable storage medium further causes the computer to act as counting means. The counting means counts, among the identification information contained in the cumulative data, the number of pieces of identification information that satisfy a predetermined condition. The first output means outputs a counting result obtained from the counting by the counting means. This configuration makes it possible to notify the user of a ranking that is created based on a result of counting, among the identification information contained in the cumulative data, numbers of pieces of identification information of respective types of content data, the identification information satisfying a predetermined condition. This effectively allows the user to readily know the popularity of each type of content data among other users. The predetermined condition herein may be, for example, being received within a specific period, or being received from a specific information processing apparatus.

In a twelfth aspect of the present invention, the program stored in the computer-readable storage medium further causes the computer to act as selection receiving means, obtaining means, and second output means. The selection receiving means receives, from a user of the information processing apparatus, a selection operation of selecting identification information from among the identification information outputted by the first output means. The obtaining means obtains, when the selection receiving means has received the selection operation, detailed information about content data that is associated with the identification information selected by the selection operation. The second output means outputs the detailed information obtained by the obtaining means. This configuration allows the user to know, in detail, content data associated with particular identification information, by merely selecting the particular identification information.

In a thirteenth aspect of the present invention, according to the program stored in the computer-readable storage medium, the obtaining means obtains the detailed information from a server. According to this configuration, even if the information processing apparatus does not store detailed information about content data in advance, the user can obtain the detailed information from the server. Accordingly, in order to allow the information processing apparatus to obtain detailed information about content data that was not yet released at the time of production of the information processing apparatus, it is not necessary to update information stored in the information processing apparatus but only necessary to store the detailed information in the server.

In a fourteenth aspect of the present invention, the program stored in the computer-readable storage medium further causes the computer to act as selection receiving means, obtaining means, and second output means. The first output means outputs, as the counting result, the number of pieces of identification information, which is counted by the counting means, and the identification information. The selection receiving means receives, from a user of the information processing apparatus, a selection operation of selecting identification information from among the identification information outputted by the first output means. The obtaining means obtains, when the selection receiving means has received the selection operation, detailed information about content data that is associated with the identification information selected by the selection operation. The second output means outputs the detailed information obtained by the obtaining means.

The above configuration allows the user to know, by referring to counted numbers of pieces of identification information, what content data has been used by a large number of other users. Accordingly, the user can select identification information, knowing what content data has been used by a large number of other users, and thereby obtain detailed information about the selected identification information. Thus, the user can readily obtain detailed information about content data that has been used by a large number of other users.

In a fifteenth aspect of the present invention, the program stored in the computer-readable storage medium further causes the computer to act as selection receiving means, obtaining means, and second output means. The selection receiving means receives, from a user of the information processing apparatus, a selection operation of selecting identification information from among the identification information outputted by the first output means. The obtaining means obtains, when the selection receiving means has received the selection operation, purchasing guidance information for allowing the user to purchase content data that is associated with the identification information selected by the selection operation. The second output means outputs the purchasing guidance information obtained by the obtaining means.

According to the above configuration, the information processing apparatus provides, in response to the user's selection of identification information, the user with purchasing guidance information about content data that is associated with the selected identification information. This eliminates, when the user wishes to purchase content data used by another user, the necessity for the user to search for purchasing guidance information for purchasing the content data. The purchasing guidance information is, for example, URL information of a website selling the content data, or screen data of a screen that acts as an interface for the user to make a purchase of the content data.

In a sixteenth aspect of the present invention, the program stored in the computer-readable storage medium is an information processing program for causing the computer to perform a predetermined transaction process with a server for purchasing content data from the server. According to the program of the sixteenth aspect, when the selection receiving means has received the selection operation, the obtaining means obtains, from the server, the purchasing guidance information for the content data which is associated with the identification information selected by the selection operation. According to this configuration, when the user wishes to purchase content data used by another user, the user can readily and speedily purchase the content data.

In a seventeenth aspect of the present invention, the program stored in the computer-readable storage medium further causes the computer to act as purchase operation receiving means, second transmitting means, and second receiving means. The obtaining means obtains the purchasing guidance information by receiving the purchasing guidance information from a server, the purchasing guidance information providing a guide for the user to perform a purchase operation of purchasing the content data. The purchase operation receiving means receives the purchase operation which the user performs in accordance with the guide of the purchasing guidance information. The second transmitting means transmits, when the purchase operation receiving means has received the purchase operation, a purchase request for the content data to the server. The second receiving means receives from the server the content data which has been purchased.

According to the above configuration, the information processing apparatus provides, in response to the user's selection of identification information, the user with purchasing guidance information about content data that is associated with the selected identification information. The user can purchase the desired content data from the server by merely performing a purchase operation in accordance with the purchasing guidance information. Thus, when the user wishes to purchase content data used by another user, the user can readily and speedily purchase the content data. For example, in the case where the purchasing guidance information is image data of a purchase order screen that provides a guide for the user to perform the purchase operation, the information processing apparatus changes the display to the purchase order screen when the user has made a selection of identification information. This allows the user to purchase content data readily and speedily.

In an eighteenth aspect of the present invention, the program stored in the computer-readable storage medium further causes the computer to act as selection receiving means, fourth transmitting means, fourth receiving means, and third output means. The selection receiving means receives, from a user of the information processing apparatus, a selection operation of selecting identification information from among the identification information outputted by the first output means. The fourth transmitting means transmits, to a server, the identification information selected by the selection operation. The fourth receiving means receives, from the server, detailed information about content data associated with the identification information selected by the selection operation, and/or purchasing guidance information for purchasing the content data. The third output means outputs the detailed information and/or the purchasing guidance information received by the fourth receiving means.

According to the above configuration, when the user has performed a selection operation of selecting identification information, the information processing apparatus transmits the selected identification information to the server, and receives from the server detailed information and/or purchasing guidance information associated with the identification information. This makes it possible to provide the user with the latest detailed information and/or the latest purchasing guidance information.

In a nineteenth aspect of the present invention, according to the program stored in the computer-readable storage medium, the identification information contains data of an icon that visually indicates the content data, and the first output means outputs data for displaying the icon, based on the data of the icon. According to this configuration, the use of the icon allows the user to visually and readily recognize the nature of the content data.

In a twentieth aspect of the present invention, according to the program stored in the computer-readable storage medium, the storage section stores at least one piece of character information. The transmission data generation means generates the transmission data such that the transmission data contains the at least one piece of character information and the identification information. The first output means generates a character image from character information that is contained in data received from said another information processing apparatus, and outputs the character image together with identification information contained in the received data. According to this configuration, the character image is displayed together with the identification information. This makes it possible to display the identification information in a visually amusing manner.

In a twenty-first aspect of the present invention, the program stored in the computer-readable storage medium further causes the computer to act as character generation operation receiving means and character generation means. The character generation operation receiving means receives a generation operation that a user of the information processing apparatus performs for generating character information. The character generation means generates, when the character generation operation receiving means has received the generation operation, the character information in accordance with the generation operation, and stores the character information in the storage section.

According to the above configuration, the information processing apparatus transmits data that contains identification information and character information generated by the user, and receives data that contains identification information and character information generated by another user (i.e., the user of another information processing apparatus). The information processing apparatus displays the identification information and a character image based on the received data. The character image is created by said another user, and therefore, shows his/her characteristics. This allows the user of the information processing apparatus to be informed of the characteristics of said another user who uses content data identified by the identification information contained in the received data.

In a twenty-second aspect of the present invention, the program stored in the computer-readable storage medium further causes the computer to act as prohibiting means. The prohibiting means performs a process of imposing, for a first predetermined period after the first receiving means has received the identification information and/or for a second predetermined period after the first transmitting means has transmitted the transmission data, a prohibition of further reception of the identification information from said another information processing apparatus which is the source of the identification information that has been received by the first receiving means and/or a prohibition of further transmission of the transmission data to said another information processing apparatus which is the destination of the transmission data that has been transmitted by the first transmitting means, and one or both of: a process of removing, after the first predetermined period has elapsed, the prohibition of further reception of the identification information from said another information processing apparatus which is the source of the identification information that has been received by the first receiving means and/or the prohibition of further transmission of the transmission data to said another information processing apparatus which is the destination of the transmission data that has been transmitted by the first transmitting means; and a process of removing, after the second predetermined period has elapsed, the prohibition of further reception of the identification information from said another information processing apparatus which is the source of the identification information that has been received by the first receiving means and/or the prohibition of further transmission of the transmission data to said another information processing apparatus which is the destination of the transmission data that has been transmitted by the first transmitting means. According to this configuration, for the first predetermined period after the information processing apparatus has received the identification information and/or for the second predetermined period after the information processing apparatus has transmitted the identification information, the information processing apparatus refrains from performing further reception of identification information from and/or further transmission of identification information to said another information processing apparatus. This prevents data reception from and/or data transmission to said another information processing apparatus from being unnecessarily repeated within a short period of time. For example, assume a case where the information processing apparatus and said another information processing apparatus are handheld terminal apparatuses and transmit/receive identification information to/from each other by short-distance wireless communication. In such a case, if the users carrying these information processing apparatuses approach each other (e.g., pass each other) so close to allow the information processing apparatuses to communicate with each other, then identification information is transmitted/received therebetween. Here, each of the first and second predetermined periods may be set to a length that is expected to be longer than a period that is required for the users to pass each other. This prevents identification information from being unnecessarily transmitted/received between the information processing apparatuses multiple times during a period in which the users pass each other only once.

After the first predetermined period has elapsed, the information processing apparatus performs previously-prohibited identification information reception from and/or previously-prohibited identification information transmission to said another information processing apparatus again, and/or, after the second predetermined period has elapsed, the information processing apparatus performs previously-prohibited identification information reception from and/or previously-prohibited identification information transmission to said another information processing apparatus again. Note that identification information of which reception from and/or transmission to said another information processing apparatus is prohibited for the first predetermined period after the reception of identification information from said another information processing apparatus has been performed and/or for the second predetermined period after the transmission of identification information to said another information processing has been performed, is both of the following: the same identification information as that previously received from said another information processing apparatus and/or the same identification information as that previously transmitted to said another information processing apparatus; and identification information different from that previously received from said another information processing apparatus and/or identification information different from that previously transmitted to said another information processing apparatus. After the first predetermined period has elapsed, the information processing apparatus is allowed to transmit to and receive from said another information processing apparatus both of the following: the same identification information as that previously received from said another information processing apparatus and/or the same identification information as that previously transmitted to said another information processing apparatus; and identification information different from that previously received from said another information processing apparatus and/or identification information different from that previously transmitted to said another information processing apparatus, and/or, after the second predetermined period has elapsed, the information processing apparatus is allowed to transmit to and receive from said another information processing apparatus both of the following: the same identification information as that previously received from said another information processing apparatus and/or the same identification information as that previously transmitted to said another information processing apparatus; and identification information different from that previously received from said another information processing apparatus and/or identification information different from that previously transmitted to said another information processing apparatus. Accordingly, for example, even if the information processing apparatus performs short-distance wireless communication with other information processing apparatuses in an area where population density is low and the number of the other information processing apparatuses is small, the information processing apparatus can still receive a certain number of pieces of identification information. Also, the user of the information processing apparatus can obtain useful information that the user has received identification information from the same user a plurality of times. Note that, in the above example, that is, in the case where the information processing apparatus and another information processing apparatus are handheld terminal apparatuses and transmit/receive identification information to/from each other by the short-distance wireless communication, if the users of these information processing apparatuses pass each other a plurality of times, the same identification information may be transmitted/received therebetween each time they pass each other. In this case, the user of the information processing apparatus can obtain useful information that the user has passed the user of said another information processing apparatus a plurality of times.

As a variation of the twenty-second aspect of the present invention, the information processing apparatus may be configured not to transmit, even after the first predetermined period or the second predetermined period has elapsed, identification information to another information processing apparatus to which the information processing apparatus has already transmitted the same identification information. As another variation, the information processing apparatus may be configured not to receive, even after the first predetermined period or the second predetermined period has elapsed, identification information which the information processing apparatus has already received.

In order to achieve the above-mentioned object, in a twenty-third aspect of the present invention, an information processing apparatus includes: a storage section for storing content data; content data execution means, transmission data generation means, first transmitting means, first receiving means, and first output means. The content data execution means executes the content data. The transmission data generation means generates transmission data that contains identification information of the content data executed by the content data execution means. The first transmitting means transmits the transmission data to another information processing apparatus. The first receiving means receives, from said another information processing apparatus, identification information of content data executed by said another information processing apparatus. The first output means outputs the identification information received by the first receiving means.

In order to achieve the above-mentioned object, in a twenty-fourth aspect of the present invention, an information processing system includes: a storage section for storing content data; content data execution means, transmission data generation means, first transmitting means, first receiving means, and first output means. The content data execution means executes the content data. The transmission data generation means generates transmission data that contains identification information of the content data executed by the content data execution means. The first transmitting means transmits the transmission data to another information processing apparatus. The first receiving means receives, from said another information processing apparatus, identification information of content data executed by said another information processing apparatus. The first output means outputs the identification information received by the first receiving means.

Note that, in this aspect, the information processing system may include a single apparatus or a plurality of apparatuses. For example, the system may include only one information processing apparatus, and the one information processing apparatus may include the storage section, the content data execution means, the transmission data generation means, the first transmitting means, the first receiving means, and the first output means. Alternatively, the system may include a server and an information processing apparatus. The server may include some of the following components: the storage section, the content data execution means, the transmission data generation means, the first transmitting means, the first receiving means, and the first output means. Then, the information processing apparatus may include the other of these components.

In order to achieve the above-mentioned object, in a twenty-fifth aspect of the present invention, an information processing method includes a content data executing step, a transmission data generating step, a transmitting step, a receiving step, and an outputting step. The content data executing step is a step of executing content data. The transmission data generating step is a step of generating transmission data that contains identification information of the content data executed at the content data executing step. The transmitting step is a step of transmitting the transmission data to another information processing apparatus. The receiving step is a step of receiving, from said another information processing apparatus, identification information of content data executed by said another information processing apparatus. The outputting step is a step of outputting the identification information received at the receiving step.

The twenty-third to twenty-fifth aspects provide the same functions and effects as those of the above first aspect.

According to the present invention, the information processing apparatus (hereinafter, referred to as "the terminal apparatus") is capable of obtaining, and notifying its user of, identification information of content data executed by a specific information processing apparatus that is a communication recipient of the terminal apparatus. Since the specific information processing apparatus is the communication recipient of the terminal apparatus, the specific information processing apparatus is closely related to the terminal apparatus. For example, in the case where the terminal apparatus obtains identification information of content data from the specific information processing apparatus by performing short-distance communication therewith, the specific information processing apparatus is located within a short distance from the terminal apparatus. In another example, in the case where the terminal apparatus obtains identification information of content data from the specific information processing apparatus over the Internet, it is likely that the user of the terminal apparatus and the user of the specific information processing apparatus know each other.

Thus, according to the present invention, the information processing apparatus (i.e., the terminal apparatus) is capable of obtaining, and notifying its user of, identification information of content data executed by another terminal apparatus that is closely related to the terminal apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 shows an example of a ranking period change screen;

DESCRIPTION OF THE PREFERRED EMBODIMENTS

Hereinafter, a system according to an embodiment of the present invention is described with reference to the drawings. The system is an example of an information processing system of the present invention. In the system, a handheld game apparatus communicates with another handheld game apparatus by short-distance wireless communication. Via the wireless communication, the handheld game apparatus receives, from the other handheld game apparatus, identification information of an application executed by the other handheld game apparatus (hereinafter, referred to as "most-recently-used app ID information D1"). The most-recently-used app ID information D1 is described below in detail with reference to FIG. 8A. The game apparatus is capable of displaying the received most-recently-used app ID information D1, thereby allowing the user of the game apparatus to know the status of usage of the application by the user of the other game apparatus, which is located nearby. The game apparatus is also capable of transmitting, to the other game apparatus, identification information of an application that the game apparatus has executed, thereby allowing the user of the other game apparatus to know the status of usage of the application by the user of the game apparatus. Note that the most-recently-used app ID information D1 is an example of identification information of the present invention. In the present embodiment, the game apparatus and the other game apparatus have the same configuration. However, the present invention is not limited thereto. They may be the same type of apparatuses with different configurations. The configuration of the game apparatus included in the system of the present embodiment is described below with reference to FIG. 1 and FIG. 2.

Figure 1:
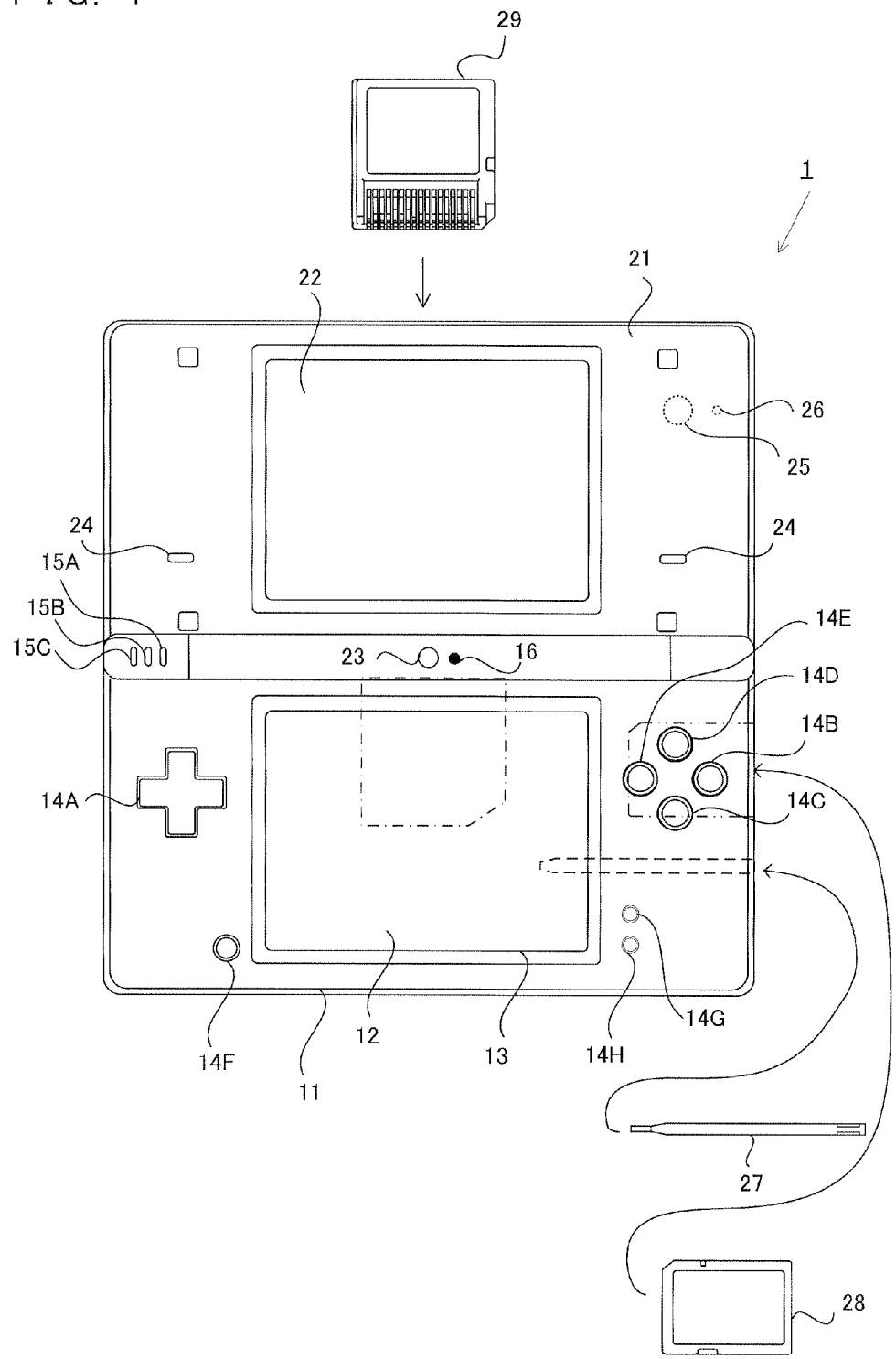
FIG. 1 is an external view of a game apparatus included in a system according to an embodiment of the present invention.

FIG. 1 is an external view of the game apparatus included in the system according to the present embodiment. The game apparatus executes a program of the present invention to act as an information processing apparatus of the present invention.

FIG. 1 shows a game apparatus 1 which is a foldable handheld game apparatus. FIG. 1 shows the game apparatus 1 in an opened state. The game apparatus 1 is in a size that allows the user to hold it with their one or both hands even when the game apparatus 1 is in the opened state.

The game apparatus 1 includes a lower housing 11 and an upper housing 21. The lower housing 11 and the upper housing 21 are connected to each other in a manner that allows them to be opened and closed (i.e., foldable). In the example of FIG. 1, the lower housing 11 and the upper housing 21 are each formed in a plate-like shape of a horizontally long rectangle, and are rotatably connected at their longer sides. Normally, the user uses the game apparatus 1 in the opened state. When not using the game apparatus 1, the user keeps the game apparatus 1 in the closed state. In the example of FIG. 1, the state of the game apparatus 1 is not limited to the opened or closed state. For example, with friction force occurring at the connection between the lower housing 11 and the upper housing 21, the game apparatus 1 can be maintained to be in an intermediate state between the opened state and the closed state, at any angle formed by the lower housing 11 and the upper housing 21. In other words, the upper housing 21 can be caused to remain stationary at any angle with respect to the lower housing 11.

The lower housing 11 includes a lower LCD (Liquid Crystal Display) 12. The lower LCD 12 has a horizontally long shape, and is disposed such that the orientation of the longer sides thereof coincides with the orientation of the longer sides of the lower housing 11. Although the LCD is used as a display device that is incorporated in the game apparatus 1 in the present embodiment, any other display device, such as a display device using EL (Electro Luminescence), may be used, for example. In the game apparatus 1, a display device having any resolution may be used. Although details are described below, the lower LCD 12 is mainly used for displaying, in real time, an image captured by an inner camera 23 or an outer camera 25.

The lower housing 11 includes operation buttons 14A to 14K and a touch panel 13 as input devices. As shown in FIG. 1, a direction input button 14A, an operation button 14B, an operation button 14C, an operation button 14D, an operation button 14E, a power button 14F, a start button 14G, and a select button 14H among the operation buttons 14A to 14K are provided at an inner main surface of the lower housing 11, which inner main surface is, when the upper housing 21 and the lower housing 11 are closed, accommodated within the game apparatus 1. The direction input button 14A is used for a selection operation, for example. The operation buttons 14B to 14E are used for a determination operation, a cancellation operation, and the like. The power button 14F is used to power ON/OFF the game apparatus 1. In the example of FIG. 1, the direction input button 14A and the power button 14F are provided at the inner main surface of the lower housing 11, so as to be located to the right or left (to the left, in FIG. 1) of the lower LCD 12 which is provided around the center of the inner main surface. The operation buttons 14B to 14E, the start button 14G, and the select button 14H are provided at the inner main surface of the lower housing 11, so as to be located to the other side (to the right, in FIG. 1) of the lower LCD 12. The start button 14G and the select button 14H are used for performing various operations with the game apparatus 1.

Note that the operation buttons 14I to 14K are not shown in FIG. 1. For example, the operation button 14I which is an L-button is provided at the left end of an upper side surface of the lower housing 11, and the operation button 14J which is an R-button is provided at the right end of the upper side surface of the lower housing 11. The L-button 14I and the R-button 14J are each used for performing an operation of instructing the game apparatus 1 to capture an image (i.e., a shutter operation), for example. Further, the operation button 14K which is a sound volume button is provided at a left side surface of the lower housing 11. The sound volume button 14K is used to adjust the sound volume of loudspeakers included in the game apparatus 1.

The game apparatus 1 further includes the touch panel 13 as another input device in addition to the operations buttons 14A to 14K. The touch panel 13 is mounted so as to cover the screen of the lower LCD 12. In the present embodiment, a resistive film type touch panel is used as the touch panel 13, for example. However, the touch panel 13 is not limited to the resistive film type touch panel, but may be any press-type touch panel. The touch panel 13 used in the present embodiment has the same resolution (detection accuracy) as that of the lower LCD 12, for example. However, the resolution of the touch panel 13 and that of the lower LCD 12 need not be the same. An insertion opening (indicated by a dashed line in FIG. 1) is provided in a right side surface of the lower housing 11. The insertion opening can accommodate a stylus pen 27 which is used for operating the touch panel 13. Although an input on the touch panel 13 is usually performed using the stylus pen 27, the touch panel 13 can be operated not only with the stylus pen 27 but with a finger of the user.

An insertion opening (indicated by a two-dot chain line in FIG. 1) for accommodating a memory card 28 is also provided in the right side surface of the lower housing 11. Inside the insertion opening, a connector (not shown) is provided for electrically connecting the game apparatus 1 and the memory card 28. The memory card 28 is, for example, an SD (Secure Digital) memory card, and detachably attached to the connector. The memory card 28 is used, for example, for storing (saving) an image captured by the game apparatus 1, and for loading an image generated by another apparatus into the game apparatus 1.

Further, an insertion opening (indicated by a dashed-dotted line in FIG. 1) for accommodating a cartridge 29 is provided in the upper side surface of the lower housing 11. Inside the insertion opening, a connector (not shown) is provided for electrically connecting the game apparatus 1 and the cartridge 29. The cartridge 29 is a storage medium which stores a game program or the like, and the cartridge 29 is detachably inserted into the insertion opening provided in the lower housing 11.

Three LEDs 15A to 15C are mounted at the left side of the connection between the lower housing 11 and the upper housing 21. Here, the game apparatus 1 is capable of performing wireless communication with other apparatuses. The first LED 15A is lit up while the power of the game apparatus 1 is ON. The second LED 15B is lit up while the game apparatus 1 is being charged. The third LED 15C is lit up while the wireless communication is being established. Thus, each of the three LEDs 15A to 15C allows the user to be informed of a state of the game apparatus 1, i.e., whether the game apparatus 1 is ON or OFF, whether the game apparatus 1 is being charged, and whether the wireless communication is being established.

The upper housing 21 includes an upper LCD 22. The upper LCD 22 has a horizontally long shape, and is disposed such that the orientation of the longer sides thereof coincides with the orientation of the longer sides of the upper housing 21. Similar to the lower LCD 12, a display device of any type different from that of the upper LCD 22, or a display device having any resolution different from that of the upper LCD 22, may be used in place of the upper LCD 22. A touch panel may be provided so as to cover the upper LCD 22. The upper LCD 22 displays, for example, an operation explanation screen for teaching the user the roles of the operation buttons 14A to 14K and the touch panel 13.

The upper housing 21 includes two cameras (the inner camera 23 and the outer camera 25). As shown in FIG. 1, the inner camera 23 is mounted at an inner main surface of the upper housing 21, in the vicinity of the aforementioned connection. On the other hand, the outer camera 25 is mounted at a surface reverse of the inner main surface at which the inner camera 23 is mounted, that is, at the outer main surface of the upper housing 21 (which acts as an external surface of the game apparatus 1 when the game apparatus 1 is in the closed state and which is the back surface of the upper housing 21 shown in FIG. 1). In FIG. 1, the outer camera 25 is indicated by a dashed line. The above arrangement allows the inner camera 23 to capture an image of a view in a direction in which the inner main surface of the upper housing 21 faces, and the outer camera 25 to capture an image of a view in a direction opposite to the image capturing direction of the inner camera 23, that is, an image of a view in a direction in which the outer main surface of the upper housing 21 faces. Thus, in the present embodiment, the two cameras, that is, the inner camera 23 and the outer camera 25, are provided such that the image capturing directions thereof are opposite to each other. For example, the user can capture, by using the inner camera 23, an image of a view that is seen from the game apparatus 1 in the direction of the user. Also, the user can capture, by using the outer camera 25, an image of a view that is seen from the game apparatus 1 in the direction opposite to the user.

A microphone (a microphone 41 shown in FIG. 2A) which acts as a sound input device is accommodated inside the inner main surface of the upper housing 21, near the aforementioned connection. Also, in the inner main surface of the upper housing 21, near the connection, a microphone hole 16 is formed so as to allow the microphone 41 to detect a sound outside the game apparatus 1. The position in which the microphone 41 is accommodated and the position of the microphone hole 16 need not be located near the connection. For example, the microphone 41 may be accommodated in the lower housing 11, and the microphone hole 16 may be provided in the lower housing 11 at a position corresponding to the position in which the microphone 41 is accommodated.

At the outer main surface of the upper housing 21, a fourth LED 26 (indicated by a dashed line in FIG. 1) is mounted. The fourth LED 26 is lit up at the time when image capturing is performed by the outer camera 25 (i.e., when the shutter button is pressed). The fourth LED 26 is also lit up while a moving image is being captured by the outer camera 25. The fourth LED 26 allows a subject of image capturing and people in the surroundings to be notified of the image capturing having been performed (or being performed) by the game apparatus 1.

In the inner main surface of the upper housing 21, sound holes 24 are formed to the right and left of the upper LCD 22, respectively, which upper LCD 22 is provided around the center of the inner main surface. Loudspeakers are accommodated in the upper housing 21 at the back of the sound holes 24, respectively. The sound holes 24 are holes for releasing sounds generated by the loudspeakers to the outside of the game apparatus 1.

As described above, the upper housing 21 includes: the inner camera 23 and the outer camera 25 which are provided for capturing images; and the upper LCD 22 which is display means for displaying an operation explanation screen at the time of, for example, image capturing. The lower housing 11 includes: input devices (the touch panel 13 and the buttons 14A to 14K) with which to perform operation inputs on the game apparatus 1; and the lower LCD 12 which is display means for displaying a game screen. Accordingly, the input devices can be used in such as manner as follows: when using the game apparatus 1, the user can hold the lower housing 11 and perform inputs via the input devices while looking at captured images (images captured by the cameras) displayed on the lower LCD 12.

Figure 2A:
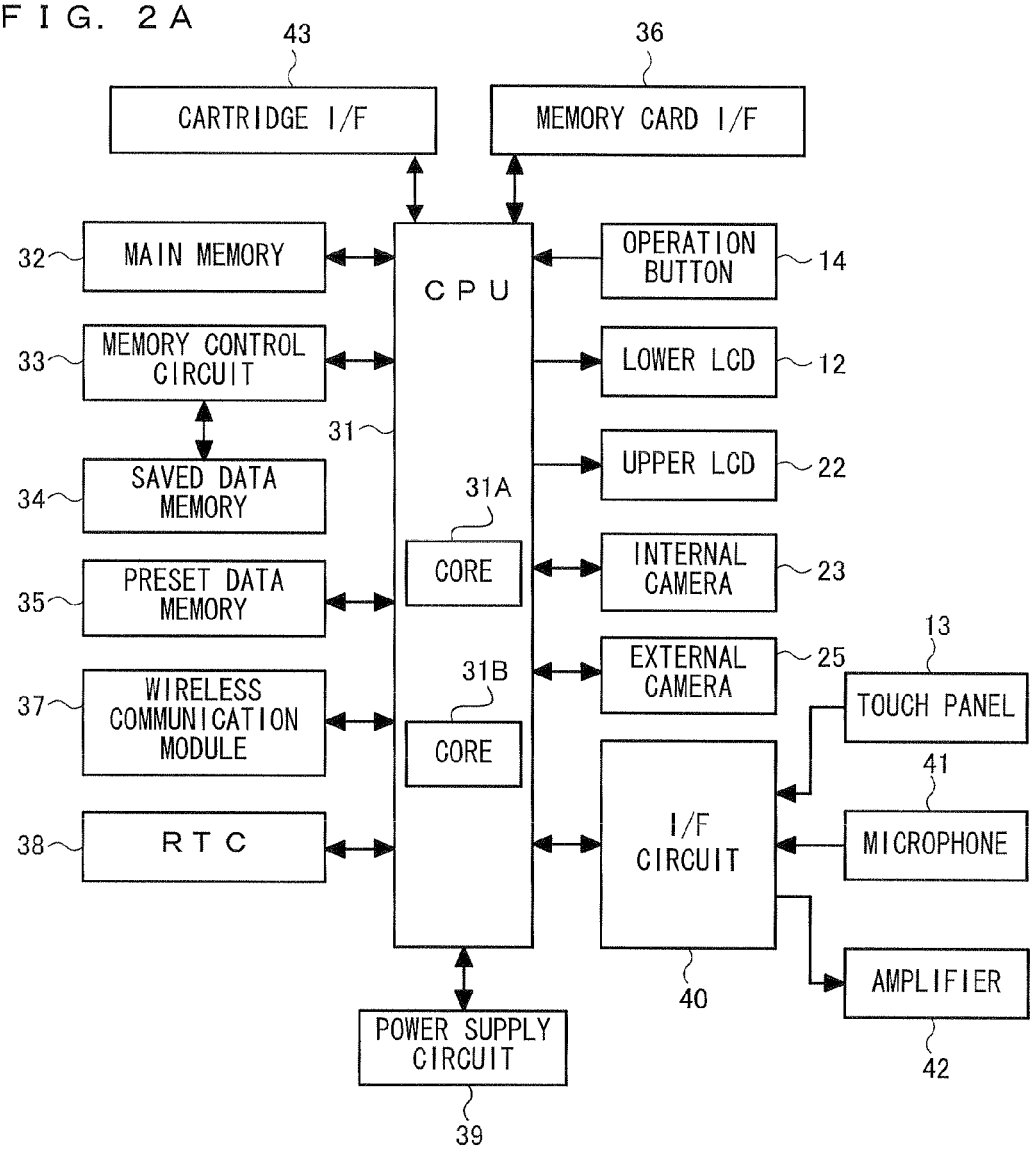
FIG. 2A is a block diagram showing an example of an internal configuration of the game apparatus.

Next, an internal configuration of the game apparatus 1 is described with reference to FIG. 2A. FIG. 2A is a block diagram showing an example of the internal configuration of the game apparatus 1.

As shown in FIG. 2A, the game apparatus 1 includes electronic components such as a CPU (Central Processing Unit) 31, a main memory 32, a memory control circuit 33, a saved data memory 34, a preset data memory 35, a memory card interface (memory card I/F) 36, a cartridge interface (cartridge I/F) 43, a wireless communication module 37, a real time clock (RTC) 38, a power supply circuit 39, an interface circuit (I/F circuit) 40, and the like. These electronic components are mounted on an electronic circuit board and accommodated in the lower housing 11 (or in the upper housing 21).

The CPU 31 is information processing means for executing predetermined programs (including an information processing program of the present invention). The CPU 31 includes a core 31A for performing processing relating to communication and a core 31B for executing an application. In the present embodiment, predetermined programs are stored in an internal memory of the game apparatus 1 (e.g., the saved data memory 34), the memory card 28, and the cartridge 29. The core 31A executes such a predetermined program to perform a part of a "passing communication" process, which is described below. The core 31B also executes such a predetermined program to perform a main process, an out-and-about application execution process, a ranking process, a setting process, a time-of-application-selection process, a portrait creation process, or other game processes, which are described below.

In the present embodiment, the core 31A solely performs a communication process. Therefore, even when the core 31B is executing an application, the core 31A can perform the communication process for communicating with another game apparatus, regardless of the execution of the application by the core 31B. Note that programs to be executed by the CPU 31 may be stored in advance in an internal memory of the game apparatus 1, or may be obtained from the memory card 28 and/or the cartridge 29, or may be obtained from another apparatus through communication therewith. For example, a program may be obtained by means of downloading via the Internet from a predetermined server, or may be obtained by downloading a predetermined program from a stationary game apparatus through communication therewith.

The main memory 32, the memory control circuit 33, and the preset data memory 35 are connected to the CPU 31. The saved data memory 34 is connected to the memory control circuit 33. The main memory 32 is storage means used as a work area and a buffer area for the CPU 31. In other words, the main memory 32 stores various data to be used in the aforementioned processing by the CPU 31, and also stores a program obtained from the outside (e.g., from the memory card 28, the cartridge 29, another apparatus, or the like). In the present embodiment, a PSRAM (Pseudo-SRAM) is used as the main memory 32, for example. The saved data memory 34 is storage means for storing a program to be executed by the CPU 31, data of images captured by the inner camera 23 and the outer camera 25, and the like. The saved data memory 34 is structured as a nonvolatile storage medium. In the present embodiment, the saved data memory 34 is structured as a NAND flash memory, for example. The memory control circuit 33 controls, in accordance with instructions from the CPU 31, reading and writing of data from and into the saved data memory 34. The preset data memory 35 is storage means for storing data (preset data), such as various parameters preset in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads and writes data from and into the memory card 28 attached to the connector, in accordance with instructions from the CPU 31. In the present embodiment, data of images captured by the outer camera 25 is written into the memory card 28, and such image data stored in the memory card 28 is read from the memory card 28 to be stored in the saved data memory 34.

The cartridge I/F 43 is connected to the CPU 31. The cartridge I/F 43 reads and writes data from and into the cartridge 29 attached to the connector, in accordance with instructions from the CPU 31. In the present embodiment, an application program is read from the cartridge 29 to be executed by the CPU 31, and data relating to the application program (e.g. saved data of a game) is written into the cartridge 29.

The wireless communication module 37 has a function of connecting to a wireless LAN, for example, by a method conformed to the standard of IEEE802.11b/g. The wireless communication module 37 is connected to the core 31A. The core 31A is capable of transmitting/receiving data to/from another apparatus via the Internet (or without using the Internet) by means of the wireless communication module 37.

The wireless communication module 37 has a function of performing wireless communication with a game apparatus of the same type as the game apparatus 1 via a predetermined communication method. Here, radio waves that the wireless communication module 37 uses in the wireless communication are, for example, weak radio waves, the use of which does not require a radio station license. For example, the wireless communication module 37 performs short-distance wireless communication of which the data transmission distance is within a range of 10 m. Accordingly, by means of the wireless communication module 37, the core 31A can transmit/receive data to/from another game apparatus 1 when a distance between the location of the core 31A and the location of this other game apparatus 1 is within a communicable range (e.g., when the distance is equal to or shorter than 10 m). The data transmission/reception is performed not only when an instruction is received from the user but is automatically repeated at a predetermined cycle without reception of an instruction from the user. That is, the core 31A automatically searches for another game apparatus 1 whose distance from the core 31A is within the communicable range. Then, the core 31A automatically establishes communication with another game apparatus 1 which is found as a result of the search, and automatically transmits/receives data to/from this other game apparatus 1. After the communication is completed, the core 31A automatically disconnects the communication. Such a series of processing is repeated at a predetermined cycle. Hereinafter, this type of communication is referred to as "passing communication". A process performed for the passing communication is hereinafter referred to as a "passing communication process".

A feature of the present embodiment is that, by means of the passing communication, the core 31A transmits, to another game apparatus 1, most-recently-used app ID information D1 that identifies an application most recently executed by the game apparatus 1 which includes the core 31A, and receives, from the other game apparatus 1, mostrecently-used app ID information D1 that identifies an application most recently executed by the other game apparatus 1.

The passing communication process is always performed while a plurality of game apparatuses 1 that are to communicate with each other are ON. To be specific, the passing communication process is performed not only when the plurality of game apparatuses 1 are in sleep mode but also while they are executing applications. The reason for this is that the core 31B solely performs application execution and the core 31A is capable of performing the passing communication process in parallel with the application execution by the core 31B. The term "sleep mode" refers to a power-saving mode where a part of the functions of the game apparatus 1 (e.g., a part of the functions of the CPU 31, a part of the functions of the display, or the like) is ceased. For example, a state where application execution is not performed since one or both of the core 31A and the core 31B are not operating, is also referred to as a sleep mode. Note that the "passing communication process" is described below in detail with reference to FIG. 12.

The RTC 38 and the power supply circuit 39 are connected to the CPU 31. The RTC 38 counts time, and outputs the time to the CPU 31. For example, the CPU 31 is capable of calculating a current time (date) and the like based on the time counted by the RTC 38. The power supply circuit 39 controls power supplied from a power source (typically, a battery accommodated in the lower housing 11) of the game apparatus 1 to supply the power to the components of the game apparatus 1.

The game apparatus 1 includes the microphone 41 and an amplifier 42. The microphone 41 and the amplifier 42 are connected to the I/F circuit 40. The microphone 41 detects a voice that is uttered by the user in the direction of the game apparatus 1, and outputs sound signals indicative of the voice to the I/F circuit 40. The amplifier 42 amplifies sound signals from the I/F circuit 40, and causes the loudspeakers (not shown) to output the amplified signals. The I/F circuit 40 is connected to the CPU 31.

The touch panel 13 is connected to the I/F circuit 40. The I/F circuit 40 includes a sound control circuit for controlling the microphone 41 and the amplifier 42 (i.e., the loudspeakers), and includes a touch panel control circuit for controlling the touch panel 13. The sound control circuit performs A/D conversion or D/A conversion of a sound signal, or converts a sound signal into sound data in a predetermined format. The touch panel control circuit generates touch position data in a predetermined format based on a signal from the touch panel 13, and outputs the touch position data to the CPU 31. For example, the touch position data indicates coordinates of a position on an input surface of the touch panel 13, at which position an input has been performed. Note that the touch panel control circuit reads a signal from the touch panel 13 and generates touch position data every predetermined period. By obtaining the touch position data via the I/F circuit 40, the CPU 31 can recognize a position on the touch panel 13, at which position an input has been performed.

Operation buttons 14 include the above-described operation buttons 14A to 14K, and are connected to the CPU 31. The operation buttons 14 output, to the CPU 31, operation data indicating input states of the operation buttons 14A to 14K (i.e., indicating whether or not the operation buttons 14A to 14K are being pressed). The CPU 31 obtains the operation data from the operation buttons 14, and thereby performs processing in accordance with inputs that have been performed via the operation buttons 14.

The inner camera 23 and the outer camera 25 are connected to the CPU 31. Each of the inner camera 23 and the outer camera 25 captures an image in accordance with an instruction from the CPU 31, and outputs data of the captured image to the CPU 31. In the present embodiment, the CPU 31 instructs one of the inner camera 23 and the outer camera 25 to capture an image, and the camera which has received the instruction captures an image and sends image data to the CPU 31.

The lower LCD 12 and the upper LCD 22 are connected to the CPU 31. Each of the lower LCD 12 and the upper LCD 22 displays an image in accordance with an instruction from the CPU 31.

Figure 2B:
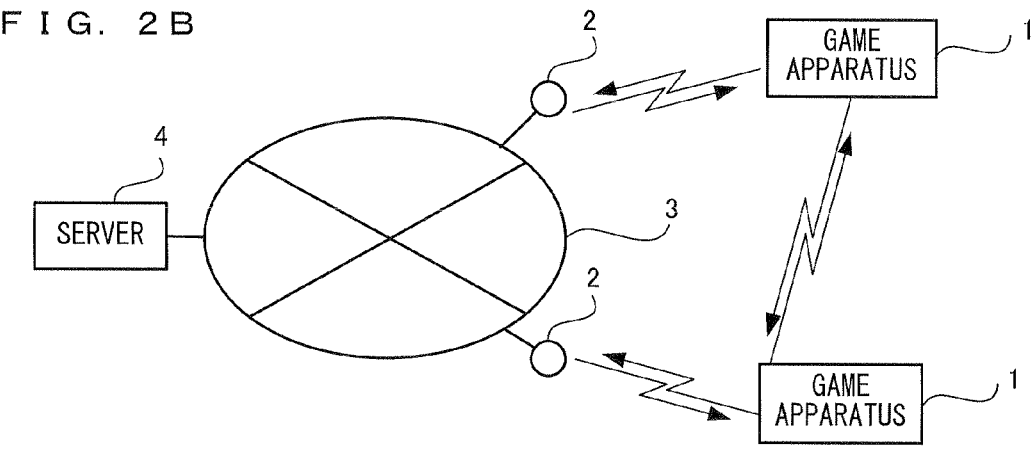
FIG. 2B shows an example of the system according to the embodiment.

Hereinafter, the system according to the present embodiment is described with reference to FIG. 2B. FIG. 2B shows an example of the system according to the present embodiment. The system according to the present embodiment includes a plurality of game apparatuses 1 and a server 4 which is communicably connected to the plurality of game apparatuses 1 via access points 2 and a network 3. The plurality of game apparatuses 1 perform the above-described passing communication, without using the server 4 or network 3, thereby transmitting/receiving most-recently-used app ID information D1 to/from each other. This allows each of the users of the plurality of game apparatuses 1 to know an application (or applications) most recently executed by the other user(s). Here, data transmission/reception by the passing communication is performable only when, as described above, the plurality of game apparatuses 1 are located such that the distance therebetween is within the communicable range. Accordingly, each user can know an application (or applications) used by the other user(s) located nearby. This allows each user to obtain useful information that is closely related to them.

Since the game apparatus 1 is a handheld game apparatus, the user carries it. Therefore, the user can obtain, wherever the user goes, identification information of other game apparatuses 1 that are located within a short distance from the user's game apparatus 1. This allows the user to know the status of usage of applications by other users whose area of activities is similar to that of the user. For example, if the user carrying the game apparatus 1 likes baseball and is in a ballpark, then the user can obtain, by using the game apparatus 1, most-recently-used app ID information D1 that indicates an application used by another user in the same ballpark, who also likes baseball.

The game apparatus 1 also performs the time-of-application-selection process for receiving, from the server 4, information in detail about an application that is indicated by most-recently-used app ID information D1 received from another game apparatus 1 (hereinafter, referred to as "detailed information"). Information referred to as the detailed information is, for example, information introducing the product (i.e., the application) or information necessary for purchasing the product (the URL of a website selling the product, data of a purchase order screen for the product, etc.). Through the reception of the detailed information, the user of the game apparatus 1 can know in detail the application used by the user of this other game apparatus 1, and purchase the application without having to search for a website selling the application.

FIG. 2B shows only two game apparatuses 1. However, the system of the present embodiment may include three or more game apparatuses 1. Moreover, the system of the present embodiment may include a plurality of servers 4. Note that the network 3 is a wired or wireless network such as the Internet, WAN, LAN, or the like.

Figure 2C:
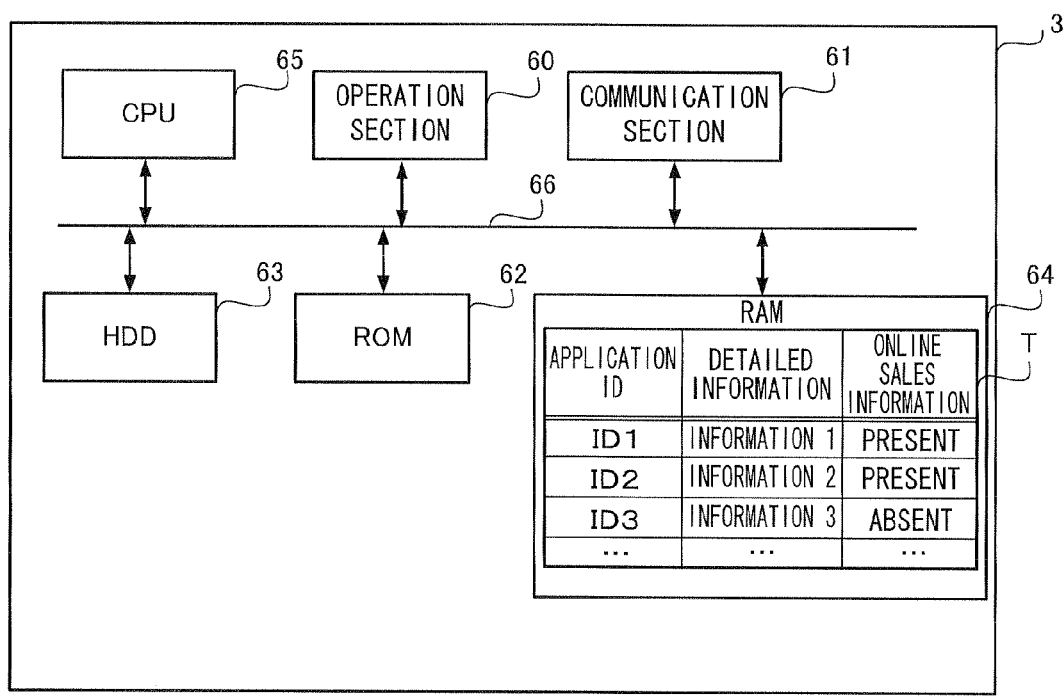
FIG. 2C is a block diagram showing an example of a configuration of a server included in the system according to the embodiment.

A configuration of the server 4 is described below with reference to FIG. 2C. FIG. 2C is a block diagram showing an example of a configuration of the server 4 included in the system according to the present embodiment.

The server 4 includes an operation section 60, a communication section 61, a ROM 62, an HDD 63, a RAM 64, and a CPU 65, which are communicably connected one another via a bus 66.

The operation section 60 has a function of receiving an operation performed by the administrator of the server 4. The communication section 61 has a function of communicating with another apparatus via the network 3. The ROM 62 stores a system program for starting the server 4 and for realizing fundamental functions of the server 4. The HDD 63 stores programs including a communication program for allowing the server 4 to communicate with the game apparatuses 1, and stores data necessary for executing the programs. The data contains detailed information to be downloaded by the game apparatuses 1. The RAM 64 acts as a work area for the CPU 65 and stores a table T which is read from the HDD 63. In the table T, application IDs, detailed information, and online sales information are registered in association with applications. Note that the online sales information indicates whether the applications can be purchased online from the server 4.

In response to a request from one of the game apparatuses 1 for distribution of detailed information, the CPU 65 searches the table T for an application ID that is contained in the request. The CPU 65 then reads detailed information that is associated with the application ID, and transmits the detailed information to the game apparatus 1 that has made the request.

Figure 3:
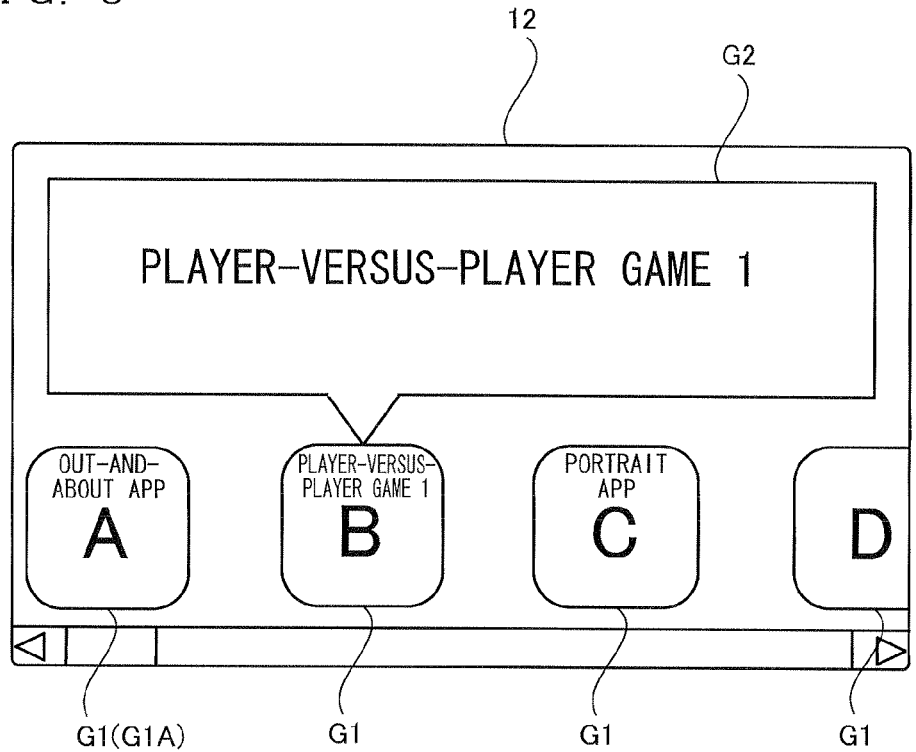
FIG. 3 shows an example of a menu screen displayed by the game apparatus.

Described below with reference to FIG. 3 is an interface for the user of the game apparatus 1 to select an application that is to be executed by the game apparatus 1. FIG. 3 shows an example of a menu screen displayed by the game apparatus 1. The game apparatus 1 is capable of storing, in the saved data memory 34, an application that is loaded from the cartridge 29 via the cartridge I/F 43 and an application downloaded from the server 4 (see FIG. 2B). Here, some applications may be stored in the saved data memory 34 as factory setting. These applications stored in the saved data memory 34 and the cartridge 29 connected to the cartridge I/F 43 are executable by the game apparatus 1.

When the power of the game apparatus 1 is turned on, the lower LCD 12 displays an icon G1 which shows such an executable application. It is understood that if there are two or more executable applications, multiple icons G1 are displayed. The user can select an application to be executed by the game apparatus 1 by touching a corresponding one of the icons G1 with the stylus pen 27 twice consecutively. Note that when the user touches an icon G1 with the stylus pen once, then a balloon G2 is displayed indicating the title of an application represented by the icon G1. In FIG. 3, the lower LCD 12 displays only four icons G1. However, by scrolling to the left or right, the user can cause the lower LCD 12 to display other icons G1.

The application, which the user has selected on the menu screen in the above manner, is executed. The game apparatus 1 stores most-recently-used app ID information D1 that identifies an application that has most recently been executed by the game apparatus 1. The game apparatus 1 transmits/receives most-recently-used app ID information D1 to/from another game apparatus 1 by the passing communication process described above.

Figure 14:
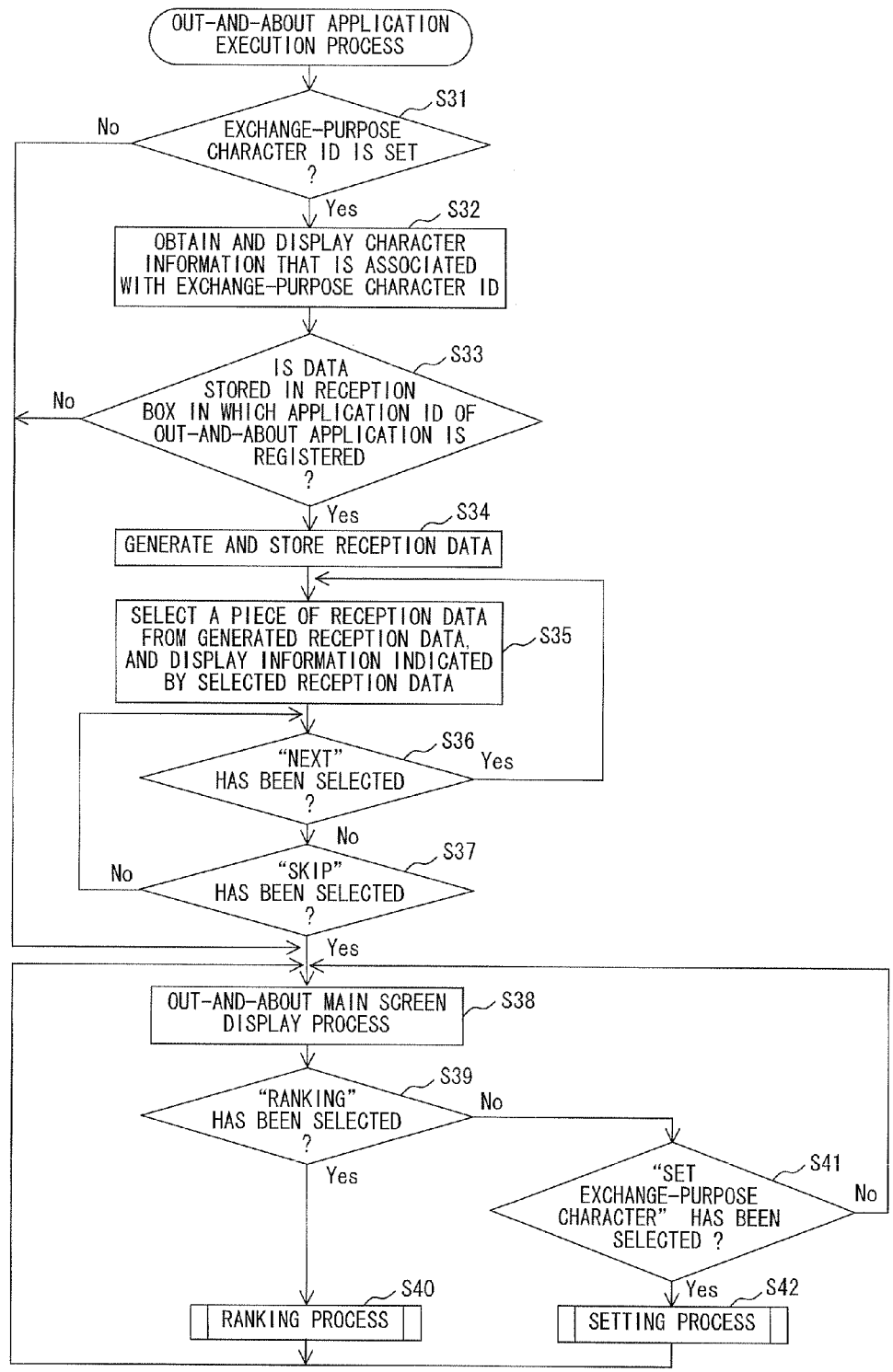
FIG. 14 is a flowchart showing an example of an out-and-about application execution process.

One of the icons G1 displayed in the menu screen shows an "out-and-about application" (hereinafter, referred to as an "out-and-about icon G1A"). When the out-and-about icon G1A is touched consecutively, the out-and-about application execution process, which is described below with reference to FIG. 14, is performed. In the out-and-about application execution process, a most-recently-used app ID information screen that shows most-recently-used app ID information D1 received from another game apparatus 1, is displayed.

Figure 4:
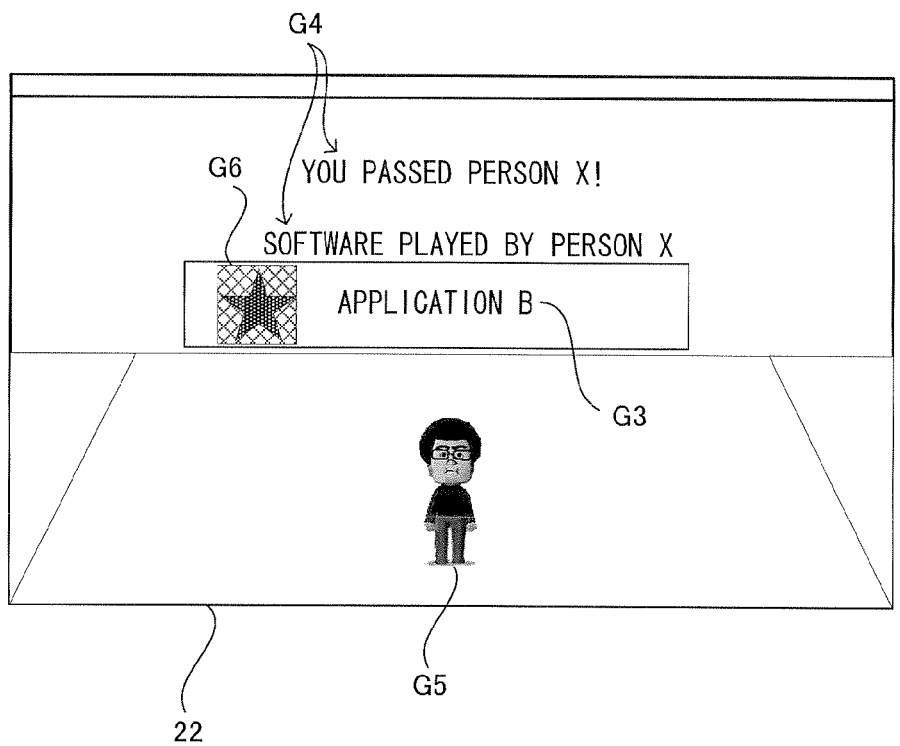
FIG. 4 shows an example of a most-recently-used app ID information screen of another user.

FIG. 4 shows an example of the most-recently-used app ID information screen, which shows information about the user of the other game apparatus 1 (hereinafter, "the other user"). The most-recently-used app ID information screen is displayed on the upper LCD 22. The most-recently-used app ID information screen shows: a title G3 of an application most recently executed by the other game apparatus 1; a user name G4 of the other user; and a character image G5 which is the avatar of the other user. This allows the user of the game apparatus 1 to know an application that has most recently been used by the other user, and to know from the character image G5 what the other user having used the application is like. Also, an icon image G6 representing the application is displayed, which allows the user to visually recognize what the application is like.

As described above, the game apparatus 1 is capable of displaying most-recently-used app ID information D1 received from another game apparatus 1. In addition, in the out-and-about application execution process, a ranking of most-recently-used app ID information D1 that has been received is displayed. In other words, the game apparatus 1 may receive a plurality of types of most-recently-used app ID information D1 from other game apparatuses 1. In the case where the user of the game apparatus 1 sets a ranking period, a ranking of a plurality of types of most-recently-used app ID information D1 is determined based on how many times each type of information D1 has been received during the ranking period. Then, the plurality of types of most-recently-used app ID information D1 are displayed with the ranking. A screen displaying the ranking is hereinafter referred to as a "ranking screen".

Figure 5:
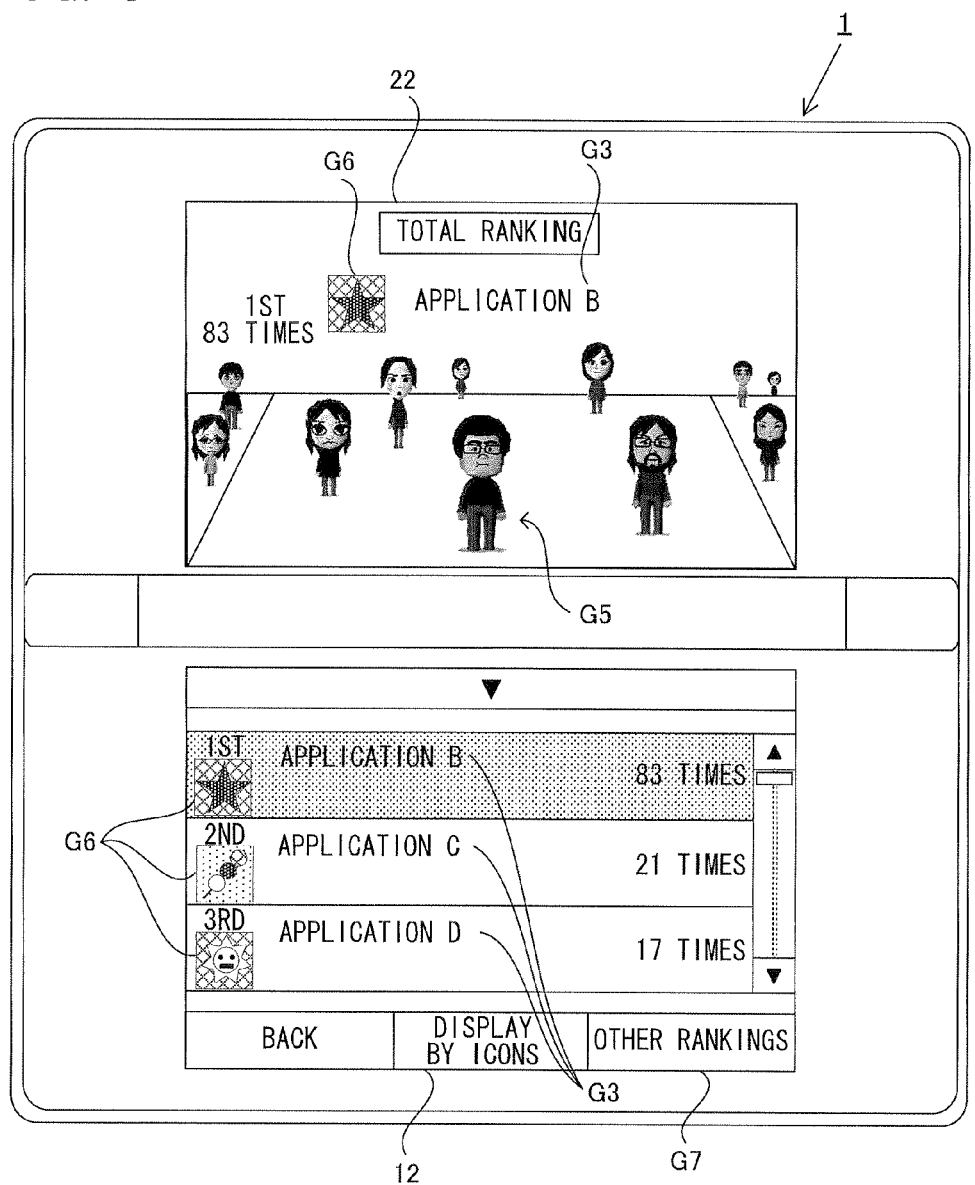
FIG. 5 shows an example of a ranking screen displayed by the game apparatus.

FIG. 5 shows an example of the ranking screen displayed by the game apparatus 1. The ranking screen is displayed on the lower LCD 12. The ranking screen shows a plurality of types of most-recently-used app ID information D1 in order of the number of times of being received during the ranking period. Each type of information D1 is shown together with the title G3, the icon image G6, the number of times of being received, and the position in the ranking. Most-recently-used app ID information D1 that has been received most frequently during the ranking period is shown at the top. The ranking screen shows all the types of most-recently-used app ID information D1 that have been received during the ranking period. The user can browse all the types of most-recently-used app ID information D1 by scrolling the ranking screen downward. Note that it is not necessary to show the ranking for most-recently-used app ID information D1 that is low in the ranking. While the ranking screen is being displayed, the upper LCD 22 shows most-recently-used app ID information D1 that is the first in the ranking. The upper LCD 22 in FIG. 5 shows the character image G5, which is a character image for the most-recently-used app ID information D1 of an application that is the first in the ranking.

Next, various programs and various data stored in the main memory 32 of the game apparatus 1 are described with reference to FIG. 6 and FIGS. 7 to 9.

Figure 6:
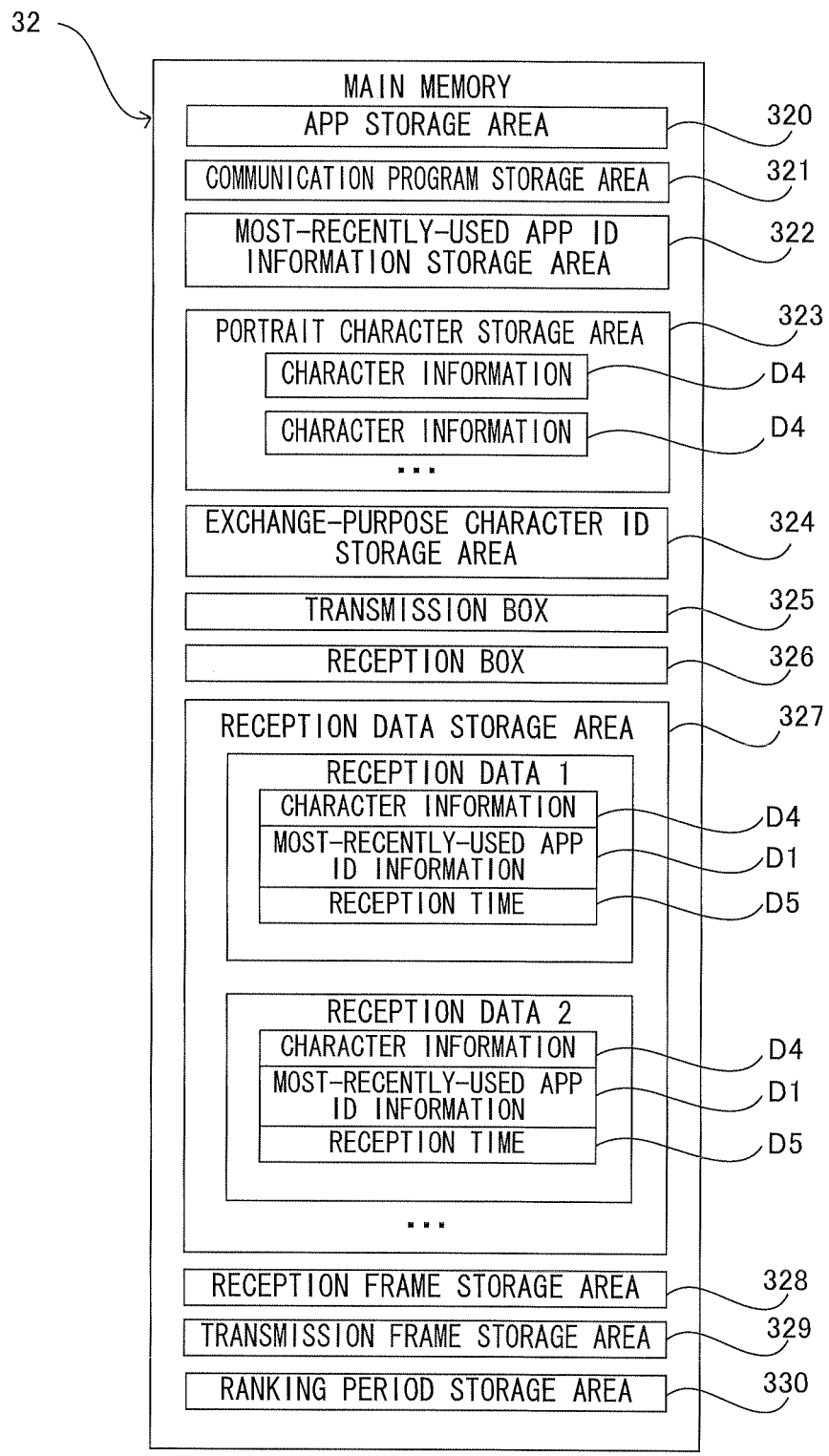
FIG. 6 shows an example of programs and various data stored in a main memory.

FIG. 6 shows an example of programs and various data stored in the main memory 32. The various data are stored in accordance with execution of programs by the game apparatus 1.

The main memory 32 includes an app storage area 320, a communication program storage area 321, a most-recently-used app ID information storage area 322, a portrait character storage area 323, an exchange-purpose character ID storage area 324, a transmission box 325, a reception box 326, a reception data storage area 327, a reception frame storage area 328, a transmission frame storage area 329, and a ranking period storage area 330.

Figure 7:
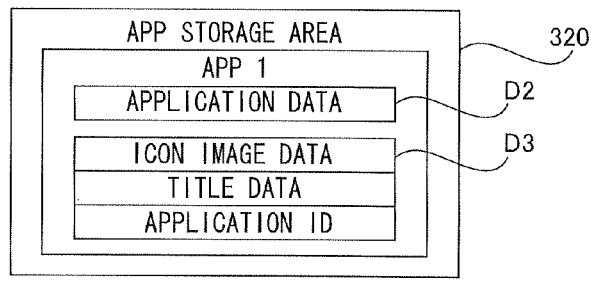
FIG. 7 shows an example of a configuration of an app storage area.

Data of an application to be executed is read from the saved data memory 34 or the cartridge 29 and stored in the app storage area 320, as necessary. An application to be stored in the app storage area 320 in this manner is, for example, the out-and-about application, a portrait application, a game program, or the like, FIG. 7 shows an example of data stored in the app storage area 320. The app storage area 320 stores application data D2 as well as app ID information D3 which is read from the saved data memory 34 or the cartridge 29. The app ID information D3 contains title data, an application ID, and icon image data. Here, the title data indicates the title of an application. The application ID is an identifier unique to the application. The icon image data visually indicates the application. Note that the app ID information D3 may contain the ID of the icon image data in place of the icon image data, and the game apparatus 1 may specify, based on the ID, the icon image data which is stored in the game apparatus 1.

The communication program storage area 321 stores a communication program which causes the core 31A and the wireless communication module 37 to perform the above-described passing communication process.

Figure 8A:
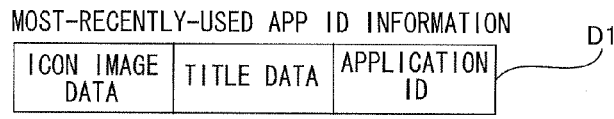
FIG. 8A shows an example of most-recently-used app ID information.

The most-recently-used app ID information storage area 322 stores a predetermined number of pieces of most-recently-used app ID information D1 that indicate applications most recently executed by the game apparatus 1. In the present embodiment, the predetermined number is 1. However, the predetermined number may be two or more. FIG. 8A shows an example of the most-recently-used app ID information D1. The most-recently-used app ID information D1 contains title data indicating the title of an application, an application ID unique to the application, and icon image data visually indicating the application.

Figure 8B:
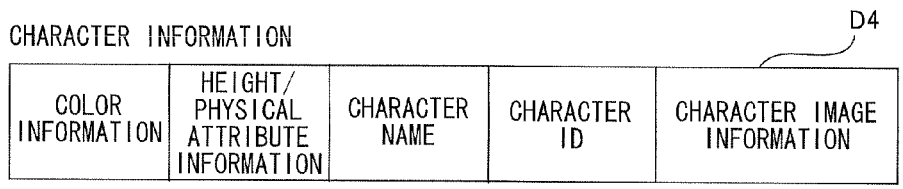
FIG. 8B shows an example of character information.

The portrait character storage area 323 stores pieces of character information D4 each indicating a character that the user of the game apparatus 1 creates at the time of executing the portrait application. FIG. 8B shows an example of the character information D4. The character information D4 contains color information which indicates a color set by the user, height/physical attribute information, a character name, a character ID, and character image information. The height/physical attribute information indicates the height (i.e., how tall) and the physical attribute (i.e., how thick) of the character, which are set by the user. The character name indicates a character name set by the user. The character ID is identification information unique to the character, which is automatically set when the character information D4 is generated. The character image information indicates image data that the user has selected for each part of a portrait character. In the portrait creation process described below with reference to FIG. 24, the game apparatus 1 receives operations which the user performs to select, for each part of a portrait character to be created (e.g., eyes, nose, mouth, outline, hair, and the like), one among pieces of option image data that indicate multiple selection options. The character image information indicates the IDs of such selected option image data in association with respective part IDs.

The exchange-purpose character ID storage area 324 stores a character ID contained in the character information D4 that is stored in the portrait character storage area 323 and that is to be transmitted, together with most-recently-used app ID information D1, to another game apparatus 1.

Figure 9:
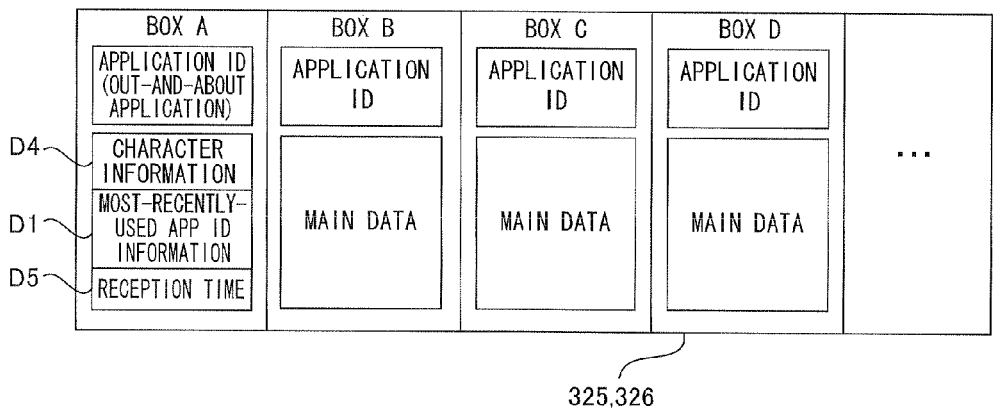
FIG. 9 illustrates an example of data stored in a transmission box.

The transmission box 325 stores information that is to be transmitted to another game apparatus 1 via the passing communication process (hereinafter, referred to as "application information"). FIG. 9 illustrates an example of data stored in the transmission box 325. The transmission box 325 stores, for each application executable by the game apparatus 1 (e.g., for each application of which the icon is displayed as shown in FIG. 3), an application ID and main data to be transmitted. The application ID and the main data are stored as the aforementioned application information. In the transmission box 325, a box A is an area for storing the application information for the out-and-about application, and the box A stores the application ID of the out-and-about application, accordingly. The box A also stores character information D4, most-recently-used app ID information D1, and reception time information D5 as the main data to be transmitted. Since the data stored in the transmission box 325 is not yet received by a communication recipient (i.e., another game apparatus 1), the box A stores, as the reception time information D5, information that indicates a lack of a reception time. Here, the box A may be configured such that only the character information D4 and the most-recently-used app ID information D1 are transmitted to another game apparatus 1 as application information (which is an example of transmission data of the present invention) and the reception time information D5 is not transmitted. Alternatively, the box A may be configured not to store the reception time information D5. Note that in the present embodiment, main data that is associated with the same application can be received a plurality of times. In such a case, the main data having been received a plurality of times are cumulatively stored in a box that stores the application ID of the application.

The reception box 326 stores information that is received from another game apparatus 1 via the passing communication process. The reception box 326 has the same configuration as that of the transmission box 325 shown in FIG. 9, except that the reception box 326 stores, as the reception time information D5, information that indicates a time when information has been received from another game apparatus 1. Application. IDs stored in the reception box 326 are the same as application IDs stored in the transmission box 325. Hereinafter, in a description where application IDs stored in the reception box 326 and application IDs stored in the transmission box 325 are not distinguished from each other, a term "box ID" is used. The game apparatus 1 receives only data associated with application IDs that are the same as box IDs stored in the transmission box 325, and updates data stored in the reception box 326 with the received data.

At the time of execution of the out-and-about application, the main data that is stored in the reception box 326 and that is associated with the application ID of the out-and-about application (i.e., character information D4, most-recently-used app ID information D1, and reception time information D5) is read and stored as reception data in the reception data storage area 327. Note that each time reception data is newly generated, the new reception data is added to the reception data that is already stored in the reception data storage area 327. If the total amount of the stored reception data has exceeded the data storage capacity, or if there exists reception data that has been stored for a predetermined period after the reception thereof, then the deletion of reception data is performed from the oldest reception data.

The reception frame storage area 328 temporarily stores a frame that is received, in the passing communication process, from another game apparatus 1 which is a communication recipient. The frame is described below in detail. The transmission frame storage area 329 temporarily stores a frame that is to be transmitted in the passing communication process to another game apparatus 1 which is a communication recipient. The frame is described below in detail.

The ranking period storage area 330 stores information that indicates a ranking period set by the user the game apparatus 1.

Figure 11A:
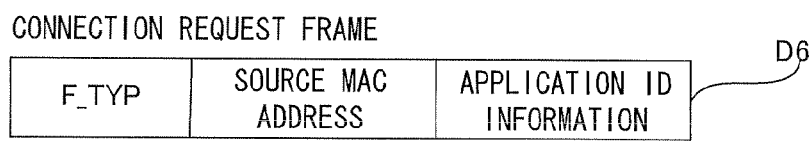
FIG. 11A shows an example of a connection request frame.
Figure 11B:
FIG. 11B shows an example of a connection response frame.
Figure 11C:
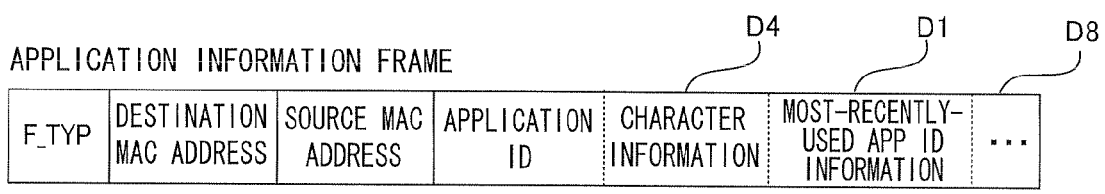
FIG. 11C shows an example of an application information frame.
Figure 12:
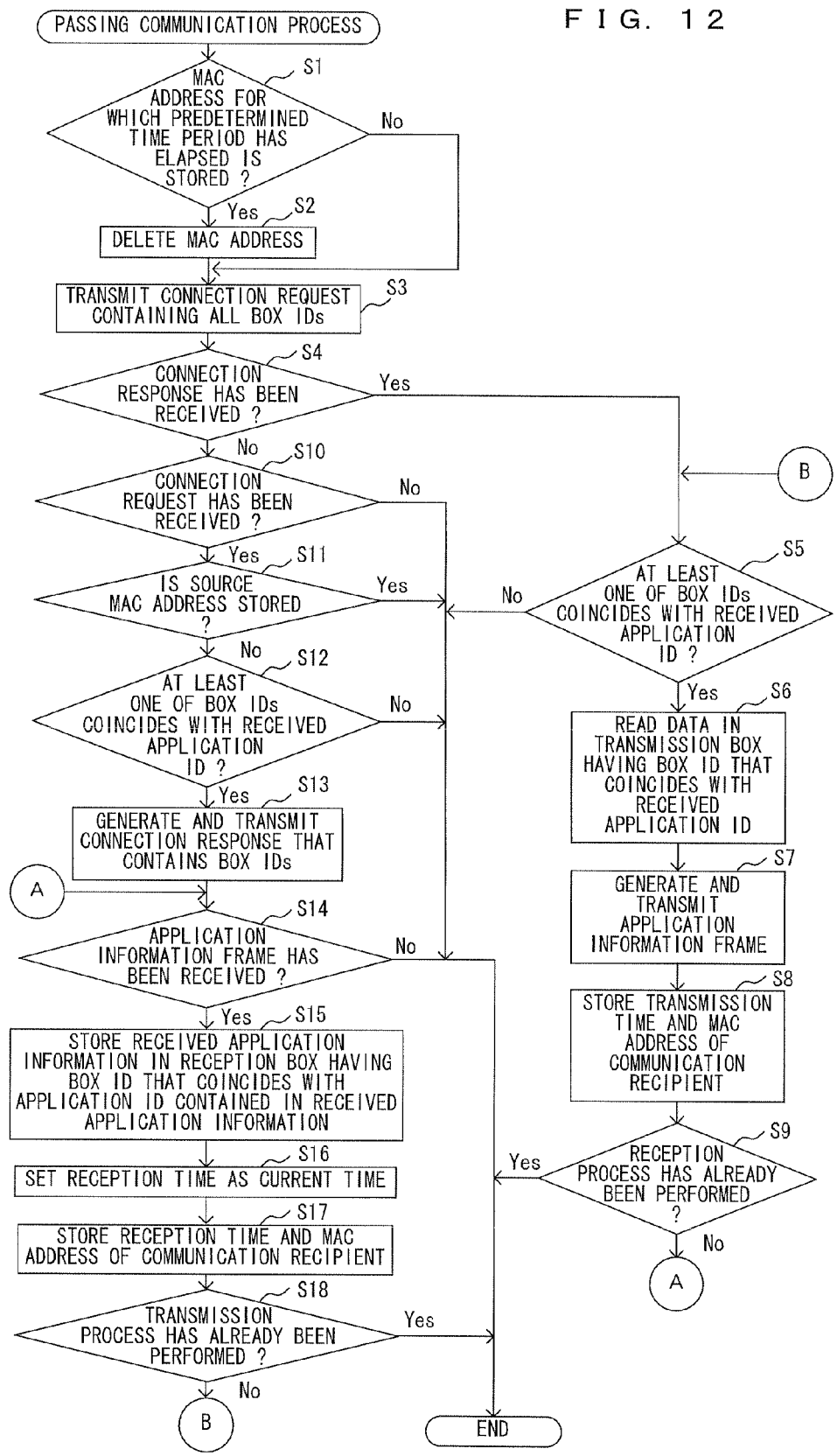
FIG. 12 is a flowchart showing an example of the passing communication process performed by the game apparatus.

Hereinafter, the above-described passing communication process is described in detail with reference to FIGS. 10 to 12. The game apparatus 1 and another game apparatus 1 both perform the passing communication process, and thus, these game apparatuses 1 perform the passing communication with each other.

Figure 10:
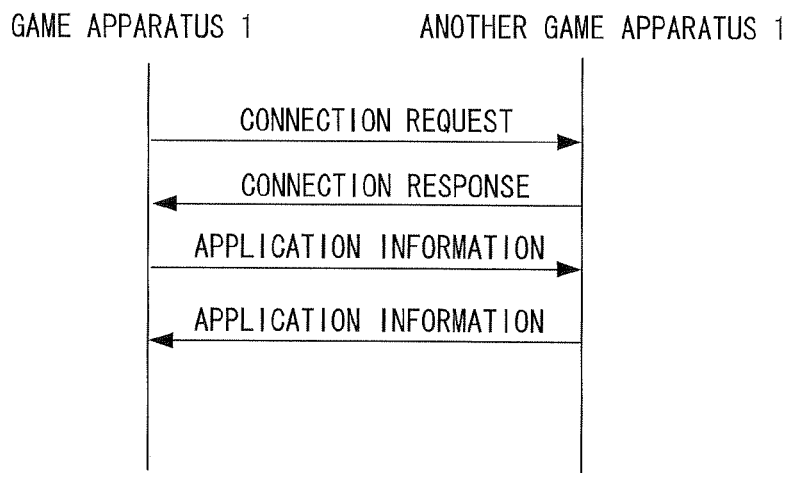
FIG. 10 is a communication sequence diagram showing an example of a passing communication process.

FIG. 10 is a communication sequence diagram showing an example of the passing communication process. This example shows a beacon frame being transmitted from the game apparatus 1 to the other game apparatus 1. The game apparatus 1 transmits, by broadcast communication, a beacon frame (a connection request frame D6) to the other game apparatus 1 which is present within the above-described communicable range. Upon receiving the connection request frame D6, the other game apparatus 1 transmits a connection response frame D7 to the game apparatus 1 which is the source of the connection request frame D6.

Upon receiving the connection response frame D7, the game apparatus 1 transmits, to the other game apparatus 1, an application information frame D8 which contains application information. Here, the application information frame D8 may contain most-recently-used app ID information D1. Upon receiving the application information frame D8, the other game apparatus 1 transmits to the game apparatus 1 an application information frame D8 that the other game apparatus has generated. In the present embodiment, such a series of communication is repeated at a predetermined cycle. Note that in the case where the game apparatus 1 receives a connection request, the frames transmitted from the game apparatus 1 to the other game apparatus 1 in the example shown in FIG. 10 are transmitted from the other game apparatus 1 to the game apparatus 1, and the frames transmitted from the other game apparatus 1 to the game apparatus 1 in the example shown in FIG. 10 are transmitted from the game apparatus 1 to the other game apparatus 1. Further, in the present embodiment, the game apparatus 1 transmits the application information frame D8 in response to receiving the connection response frame D7. However, as an alternative, the game apparatus 1 may transmit the application information frame D8 at the timing of transmitting the connection response frame D7.

Hereinafter, frames D6 to D8 transmitted/received in the passing communication are described with reference to FIGS. 11A to 11C. FIG. 11A shows an example of the connection request frame D6. The connection request frame D6 contains a frame type F_TYP, a source MAC (Media Access Control) address, and application ID information. The frame type F_TYP indicates the type of the connection request frame D6. In this example, the frame type F_TYP indicates information that the frame is a connection request frame D6. The application ID information indicates all the box IDs of the game apparatus 1 transmitting the connection request frame D6. Note that, as described above, the term "box ID" refers to an application ID that is stored in both the transmission box 325 and the reception box 326.

Next, the connection response frame D7 is described. FIG. 11B shows an example of the connection response frame D7. The connection response frame D7 contains a frame type F_TYP, a destination MAC address, a source MAC address, and application ID information. The frame type F_TYP indicates information that the frame is a connection response frame D7. The application ID information indicates all the box IDs of the game apparatus 1 transmitting the connection response frame D7.

Described next is the application information frame D8. FIG. 11C shows an example of the application information frame D8. The application information frame D8 contains a frame type F_TYP, a destination MAC address, a source MAC address, and application information. As described above, the application information contains an application ID and main data associated with the application ID. The application information contained in the application information frame D8 is only application information that is among application information stored in the transmission box 325 of a source game apparatus 1 (i.e., the source of the application information frame D8) and that is associated with an application ID coinciding with a box ID of a destination game apparatus 1 (i.e., the destination of the application information frame D8).

As described above with reference to FIG. 9, in the case where the game apparatus 1 stores the out-and-about application, the transmission box 325 stores, as application information, the application ID of the out-and-about application, character information D4, most-recently-used app ID information D1, and reception time information D5. Accordingly, in the case where both the game apparatus 1 and the other game apparatus 1 store the out-and-about application, the application ID of the out-and-about application, the character information D4, and the most-recently-used app ID information D1 are contained in the application information frame D8 as application information.

Hereinafter, the passing communication process performed by the game apparatus 1 is described with reference to FIG. 12. FIG. 12 is a flowchart showing an example of the passing communication process performed by the game apparatus 1. The passing communication process is repeated at a predetermined cycle (e.g., at short intervals such as once in a few seconds). First, the wireless communication module 37 determines whether the memory of the wireless communication module 37 stores a MAC address for which a predetermined period has elapsed from a response time (i.e., a time when the wireless communication module 37 has received a connection response from the MAC address, or a time when the wireless communication module 37 has transmitted or received data to or from the MAC address in response to receiving a connection response from the MAC address) (S1). When determining that the memory stores a MAC address for which the predetermined time has elapsed from the response time (YES at S1), the wireless communication module 37 deletes the MAC address (S2). When determining that the memory does not store such a MAC address (NO at S1), the wireless communication module 37 advances the processing to the next step S3 without deleting the MAC address.

Next, the wireless communication module 37 generates a connection request frame D6 (see FIG. 11A) that contains all the box IDs and transmits the connection request frame D6 by broadcast communication (S3). Thereafter, the wireless communication module 37 determines whether a connection response frame D7 (see FIG. 11B) has been received (S4). When determining that a connection response frame D7 has been received (YES at S4), the wireless communication module 37 further determines whether at least one application ID contained in the connection response frame D7 coincides with a box ID of the game apparatus 1 (S5). Note that the wireless communication module 37 stores box IDs in the memory (i.e., an internal memory of the wireless communication module 37) when the power of the game apparatus 1 is turned on. The wireless communication module 37 performs the determination at step S5 by using the stored box IDs. When determining that at least one application ID contained in the connection response frame D7 coincides with a box ID of the game apparatus 1 (YES at S5), the wireless communication module 37 instructs the core 31A to read application information associated with an application ID that coincides with the at least one application ID in the connection response frame D7, and the core 31A reads the application information in response to the instruction (S6). Note that when the game apparatus 1 is in sleep state and the core 31A is not started, the wireless communication module 37 starts the core 31A prior to step S6. Next, the wireless communication module 37 generates an application information frame D8 that contains the application information read by the core 31A, and transmits the application information frame D8 to the source of the connection response frame D7 (S7).

Thereafter, the wireless communication module 37 stores, in its memory, the source MAC address of the connection response frame D7 and the response time (i.e., the current time) (S8). The source MAC address and the current time stored here are used for prohibiting, for a predetermined period after the response time, communication from being performed between the wireless communication module 37 and the same communication recipient. Note that if the predetermined period has elapsed from the response time, the MAC address is deleted at the above-described steps S1 and S2, and thus, the prohibition of communication is removed. Thereafter, the wireless communication module 37 advances the processing to step S9.

On the other hand, when the wireless communication module 37 determines that none of the application IDs contained in the connection response frame D7 coincides with a box ID of the game apparatus 1 (NO at S5), the wireless communication module 37 ends the passing communication process.

At step S9, the wireless communication module 37 determines whether a process of receiving an application information frame D8 has been performed (S9). If the process of receiving an application information frame D8 has been performed (YES at S9), the wireless communication module 37 ends the passing communication process. If the process of receiving an application information frame D8 has not been performed (NO at S9), the wireless communication module 37 performs step S14, which is described below, to perform a process of receiving an application information frame D8. The reason for this is that the two game apparatuses 1 performing the passing communication transmit/receive application information frames D8 to/from each other. Accordingly, if the game apparatus 1 has not yet received an application information frame D8, the processing proceeds to step S14.

Described next is a process that is performed by the wireless communication module 37 in the case where the wireless communication module 37 has determined that a connection response frame D7 has not been received (NO at S4). Here, the wireless communication module 37 determines whether a connection request frame D6 has been received (S10). When determining that a connection request frame D6 has been received (YES at S10), the wireless communication module 37 further determines whether the memory of the wireless communication module 37 stores the source MAC address of the connection request frame D6 (S11). When determining that the memory does not store the source MAC address of the connection request frame D6 (NO at S11), the wireless communication module 37 further determines whether at least one application ID contained in the connection request frame D6 coincides with a box ID of the game apparatus 1 (S12).

When determining that at least one application ID contained in the connection request frame D6 coincides with a box ID of the game apparatus 1 (YES at S12), the wireless communication module 37 generates a connection response frame D7 that contains all the box IDs of the game apparatus 1 and transmits the connection response frame D7 to the source of the connection request frame D6 (S13). Thereafter, the wireless communication module 37 performs step S14, which is described below.

On the other hand, when the wireless communication module 37 determines that a connection request frame D6 has not been received (NO at S10), the wireless communication module 37 ends the passing communication process. Also, when determining that the memory stores the source MAC address of the connection request frame D6 (YES at S11), the wireless communication module 37 ends the passing communication process. This prevents communication from being repeatedly performed with the same communication recipient within a short period of time (i.e., within the predetermined period after the response time). When the wireless communication module 37 determines that no application ID contained in the connection request frame D6 coincides with an application ID in the reception box 326 (No at S12), the wireless communication module 37 ends the passing communication process.

Next, a process at step S14 is described. The wireless communication module 37 determines whether an application information frame D8 has been received (S14). If an application information frame D8 has not been received (NO at S14), the wireless communication module 37 ends the passing communication process. On the other hand, if an application information frame D8 has been received (YES at S14), the wireless communication module 37 instructs the core 31A to store the application information of the application information frame D8 in the reception box 326, and the core 31A stores the application information in the reception box 326 in response to the instruction (S15). Note that when the game apparatus 1 is in sleep state and the core 31A is not started, the wireless communication module 37 starts the core 31A prior to step S15. Here, the core 31A stores the application information in a box having a box ID that coincides with an application ID contained in the application information. If the box already stores application information, the application information of the received application information frame D8 is added to the application information which is already stored in the box. Further, the core 31A stores the current time in the reception box 326 as reception time information D5 in association with the additionally stored application information (S16).

Thereafter, the wireless communication module 37 stores, in its memory, the MAC address of the communication recipient (i.e., the source MAC address of the connection request frame D6) as well as the response time (i.e., the current time) (S17). Similar to the information stored at step S8, the source MAC address and the response time stored here are used for prohibiting, for a predetermined period after the response time, communication from being performed between the wireless communication module 37 and the same communication recipient.

Next, the wireless communication module 37 determines whether a process of transmitting an application information frame D8 has already been performed (S18). When determining that a process of transmitting an application information frame D8 has already been performed (YES at S18), the wireless communication module 37 ends the passing communication process. On the other hand, when determining that a process of transmitting an application information frame D8 has not been performed (NO at S18), the wireless communication module 37 advances the processing to step S5 and performs a process of transmitting an application information frame D8. The reason for this is that the two game apparatuses 1 performing the passing communication transmit/receive application information frames D8 to/from each other. Accordingly, if the game apparatus 1 has not yet transmitted an application information frame D8, the processing proceeds to step S5.

Figure 13:
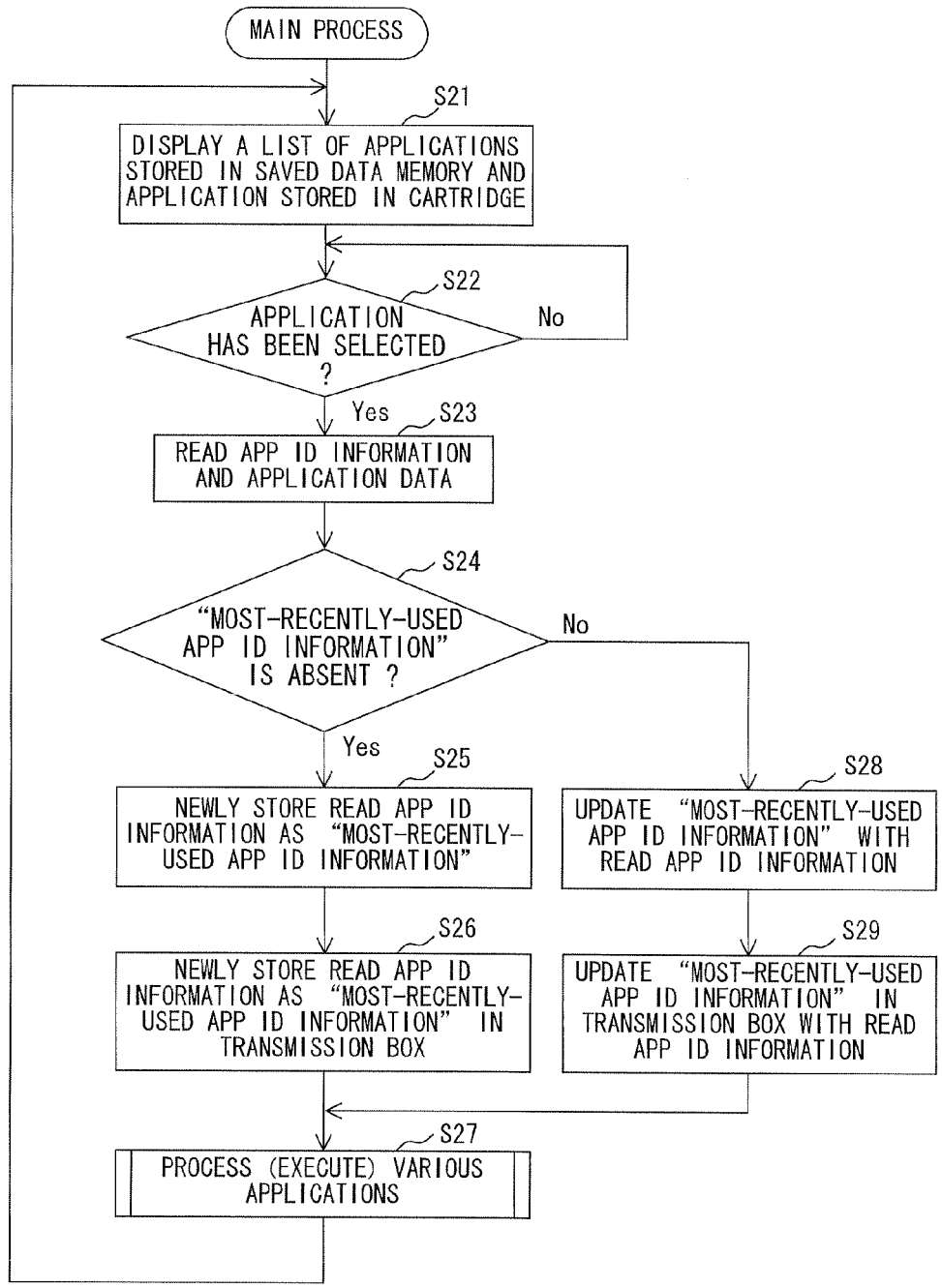
FIG. 13 is a flowchart showing an example of a main process performed by the game apparatus.

Next, the main process performed by the core 31B is described with reference to FIG. 13. The main process is performed when the power of the game apparatus 1 is turned on. FIG. 13 is a flowchart showing an example of the main process performed by the game apparatus 1. The core 31B performs a process of displaying a menu screen that shows a list of application icons for applications stored in the saved data memory 34 and an application stored in the cartridge 29 currently inserted in the game apparatus 1 (S21). The menu screen is as described above with reference to FIG. 3, for example. Next, the core 31B repeatedly determines whether an application selection operation has been received, until the core 31B determines "YES" (S22). When determining that an application selection operation has been received (YES at S22), the core 31B reads application data D2 (see FIG. 7) and app ID information D3 (see FIG. 7) of the selected application from the saved data memory 34 or the cartridge 29 (S23). Then, the core 31B determines whether most-recently-used app ID information D1 is absent in the main memory 32 (S24).

When determining that most-recently-used app ID information D1 is absent in the main memory 32 (YES at S24), the core 31B stores the read app ID information D3 as most-recently-used app ID information D1 in the most-recently-used app ID information storage area 322 (S25), and also stores the read app ID information D3 as most-recently-used app ID information D1 in one box included in the transmission box 325, which one box has a box ID coinciding with the application ID of the out-and-about application (S26). Thereafter, the core 31B executes the read application data D2 (S27) and returns the processing to step S21.

On the other hand, when the core 31B determines that most-recently-used app ID information D1 is present in the main memory 32 (NO at S24), the core 31B updates the most-recently-used app ID information D1 that is stored in the most-recently-used app ID information storage area 322 with the read app ID information D3 (S28), and also updates the most-recently-used app ID information D1 that is stored in the transmission box 325 with the read app ID information D3 (S29). Thereafter, the core 31B performs the aforementioned process at step S27 and returns the processing to step S21.

Figure 15:
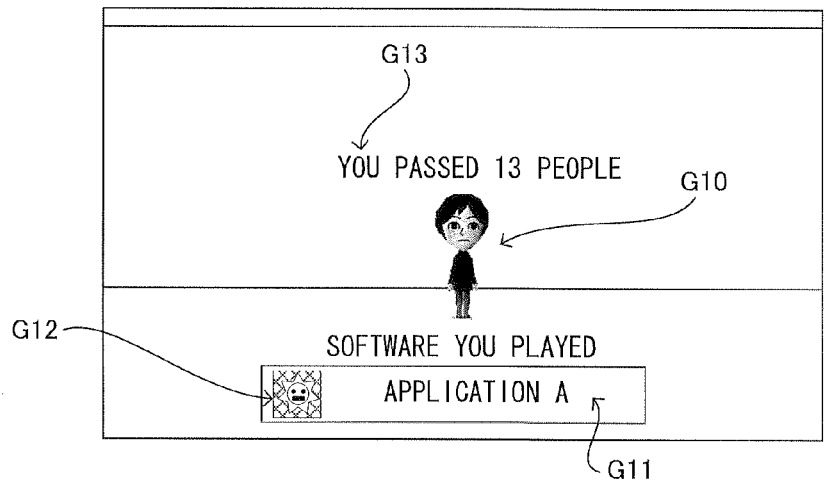
FIG. 15 shows an example of a used app display screen.

Next, the aforementioned process at step S27 of FIG. 13 that is performed at the execution of the out-and-about application is described with reference to FIG. 14. This process is hereinafter referred to as an out-and-about application execution process. FIG. 14 is a flowchart showing an example of the out-and-about application execution process. First, the core 31B determines whether an exchange-purpose character ID is stored in the exchange-purpose character ID storage area 324 (see FIG. 6) (S31). When determining that an exchange-purpose character ID is stored in the exchange-purpose character ID storage area 324 (see FIG. 6) (YES at S31), the core 31B reads, from the portrait character storage area 323, character information D4 that is associated with the exchange-purpose character ID. Based on the character information D4, the core 31B generates and displays a character image G10 (S32). Here, a used app display screen as illustratively shown in FIG. 15 is displayed. The used app display screen shows not only the character image G10 but also the title G11 and the icon G12 of an application that the user of the game apparatus 10 has most recently used as well as the number of persons G13 which indicates the number of persons with whom the user has performed the passing communication. The display of these types of information is performed at step S32, by obtaining the most-recently-used app ID information D1 stored in the most-recently-used app ID information storage area 322 and the number of pieces of main data stored in a box included in the reception box 326, which box has a box ID coinciding with the application ID of the out-and-about application. Thereafter, the processing proceeds to the next step S33.

If the core 31B determines that an exchange-purpose character ID is not stored in the exchange-purpose character ID storage area 324 (NO at S31), the core 31B performs neither the process at step S32, i.e., displaying of the character image G10, nor below-described processes at steps S33 to S37, and advances the processing to step S38.

The core 31B refers to the reception box 326 at step S33, and determines whether main data is stored in the box in which the application ID of the out-and-about application is stored (S33). If main data is stored in the box in which the application ID of the out-and-about application is stored (YES at S33), the core 31B reads the main data (i.e., character information D4, most-recently-used app ID information D1, and reception time information D5), and then generates reception data that contains the read main data and stores (i.e., adds) the generated reception data in the reception data storage area 327 (S34).

Figure 16:
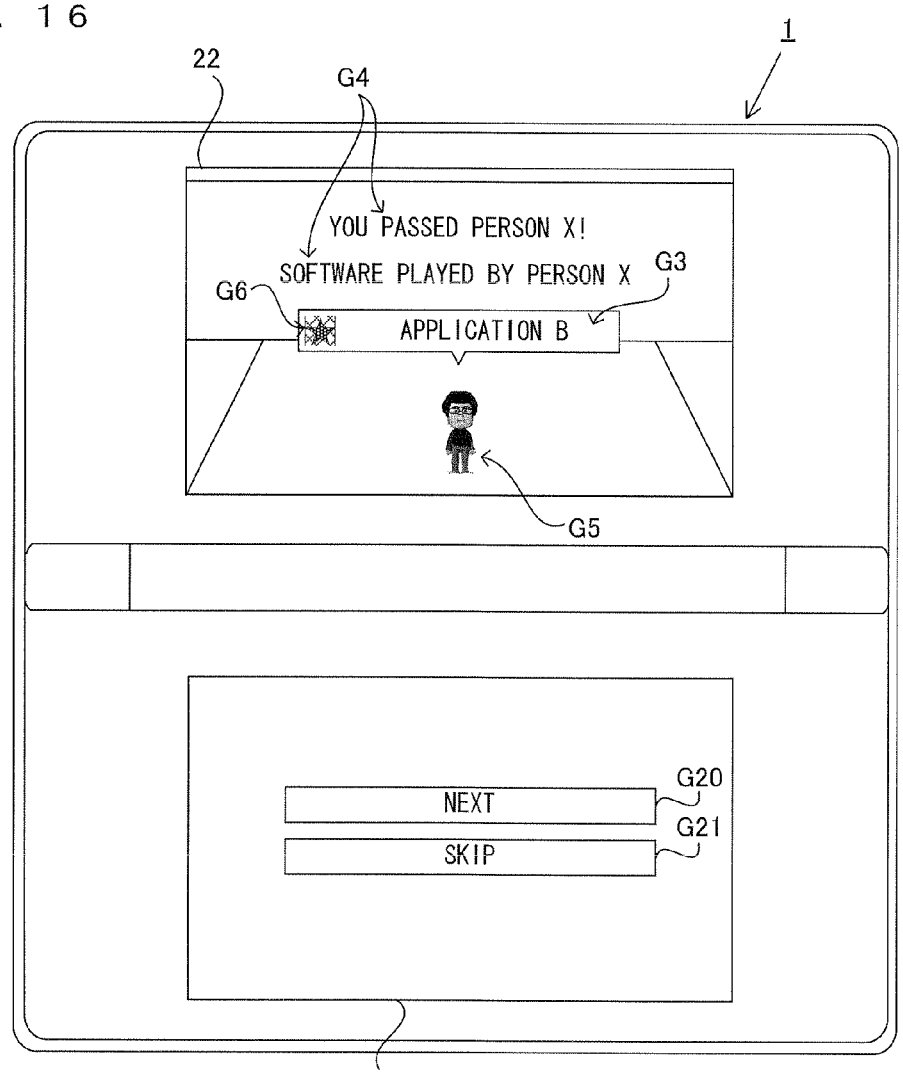
FIG. 16 shows an example of a most-recently-used app ID information screen of another user.

Next, the core 31B performs a process of selecting, at random or in accordance with a predetermined sequence, a piece of reception data from the reception data generated at step S34, i.e., from the reception data which indicates application information most recently read from the reception box 326, and displaying information indicated by the selected reception data (S35). Here, the upper LCD 22 displays a most-recently-used app ID information screen about the other user as shown in FIG. 16. Also, the lower LCD 12 displays two operation buttons G20 and G21 that are "NEXT" and "SKIP". Note that the most-recently-used app ID information screen about the other user is the same screen as that described above with reference to FIG. 4, and therefore, the description thereof is omitted.

Next, the core 31B determines whether the operation button G20 "NEXT" has been selected (S36). When determining that the operation button G20 "NEXT" has been selected (YES at S36), the core 31B returns the processing to step S35 to select a different piece of reception data. Based on the selected reception data, the core 31B changes information displayed in the most-recently-used app ID information screen. On the other hand, when the core 31B determines that the operation button G20 "NEXT" has not been selected (NO at S36), the core 31B further determines whether the operation button G21 "SKIP" has been touched (S37). When determining that the operation button G21 "SKIP" has not been touched (NO at S37), the core 31B returns the processing to step S36. On the other hand, when the core 31B determines that the operation button G21 "SKIP" has been touched (YES at S37), the core 31B performs a process at step S38. Note that, in the case where the operation button G20 "NEXT" is touched at step S36, if no more reception data is yet to be displayed, then it is determined "NO" at step S36 and "YES" at step S37. Thereafter, the process at step S38 is performed.

If no main data is stored in the box which stores the application ID of the out-and-about application (NO at S33), the core 31B does not perform the above-described processes at steps S34 to S37, and advances the processing to the next step S38.

Figure 17:
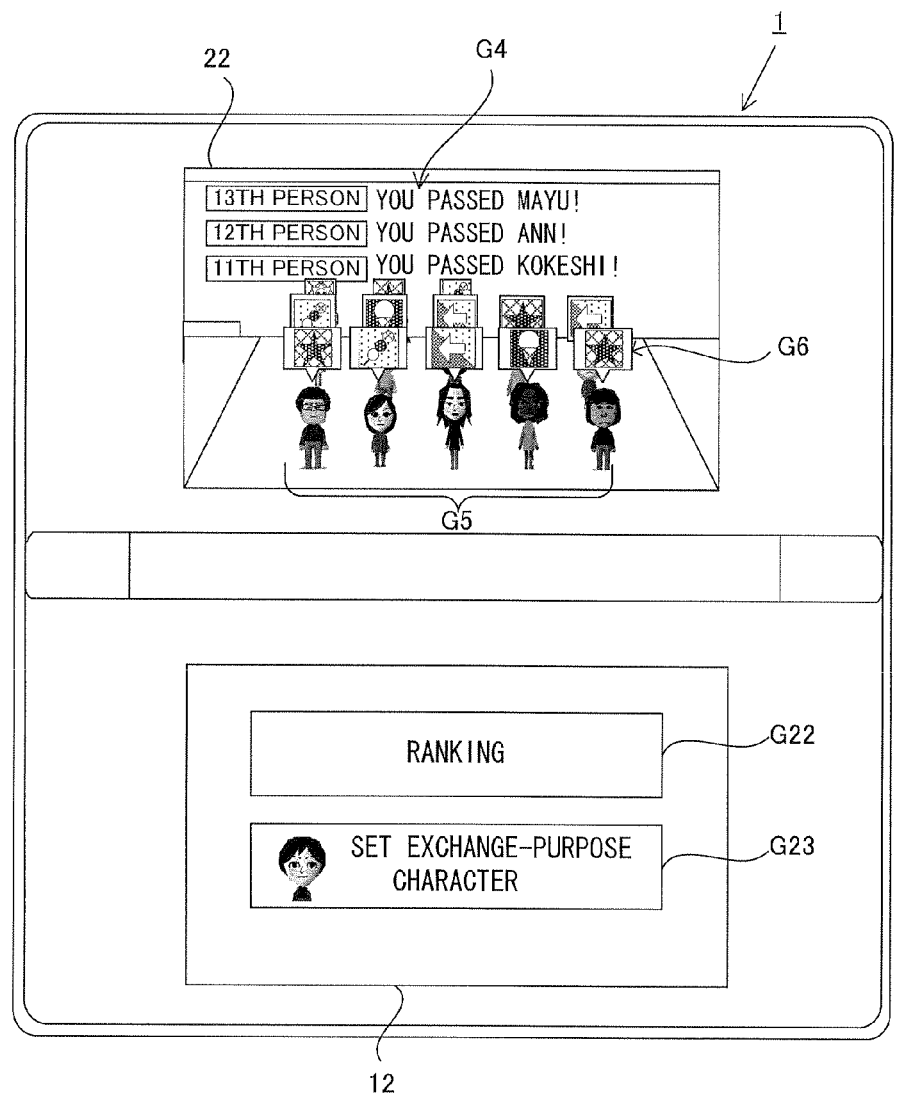
FIG. 17 shows an example of out-and-about app main screens.

Next, the process at step S38 is described. The core 31B performs a process of displaying main screens for the out-and-about application (hereinafter, "out-and-about main screens") (S38). FIG. 17 shows an example of the out-and-about main screens. The upper LCD 22 displays an out-and-about upper main screen, and the lower LCD 12 displays an out-and-about lower main screen. The out-and-about upper main screen shows character images G5 that are generated based on the character information D4 contained in the reception data. In the upper main screen, the character images G5 corresponding to the reception data are arranged in reverse chronological order based on the respective reception time points of the reception data such that, among the character images G5, those corresponding to reception data received at earlier time points are shown at the front in the upper main screen (as shown in FIG. 17). Note that, in the present embodiment, the out-and-about upper main screen shows only a predetermined number of character images G5 that can be shown in the screen. In other words, the out-and-about upper main screen does not always show all the character images G5 for the stored reception data. However, as an alternative, the out-and-about upper main screen may show all the character images G5 for the stored reception data, which may be realized by displaying, on the upper LCD 22, a moving picture in which the character images G5, which are arranged in reverse chronological order based on the respective reception time points of the reception data, are marching forward.

The out-and-about upper main screen shows icons G6 for the character images G5, respectively, such that each icon 6 is shown above a corresponding character image G5. These icons G6 are shown for the most recently generated reception data, together with corresponding character names as well as messages that indicate what number each character is in a sequence of passing communication that has been performed. What number each character is in the sequence of passing communication is determined based on the respective reception time points of the reception data. The lower LCD 12 displays the out-and-about lower main screen, which shows an operation button G22 "RANKING" and an operation button G23 "SET EXCHANGE-PURPOSE CHARACTER".

Returning to FIG. 14, the core 31B determines whether the operation button G22 "RANKING" has been touched (S39). When determining that the operation button G22 "RANKING" has been touched (YES at S39), the core 31B performs a process of displaying a ranking screen, which is described above with reference to FIG. 5 (hereinafter, referred to as a "ranking process") (S40). Thereafter, the core 31B returns the processing to step S38 to display the out-and-about app main screens. On the other hand, when the core 31B determines that the operation button G22 "RANKING" has been touched (NO at S39), the core 31B further determines whether the operation button G23 "SET EXCHANGE-PURPOSE CHARACTER" has been touched (S41). Subsequently, the core 31B performs a process of setting an exchange-purpose character which is an avatar of the user (hereinafter, referred to as a "setting process") (S42). Then, the core 31B returns the processing to step S38 to display the out-and-about app main screens.

Figure 18:
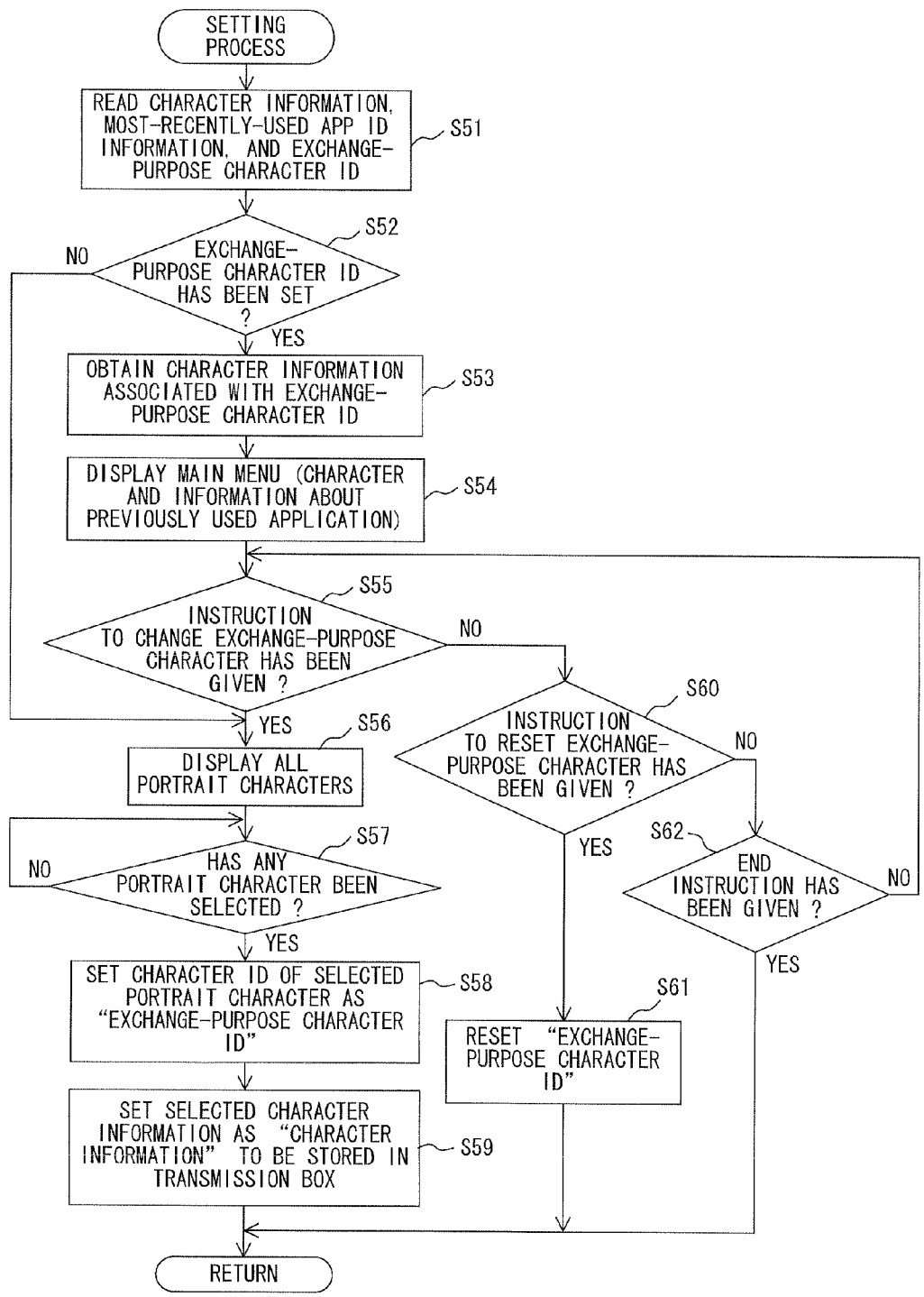
FIG. 18 is a flowchart showing an example of a setting process.

Next, the setting process performed at step S42 of FIG. 14 is described. FIG. 18 is a flowchart showing an example of the setting process.

Figure 19:
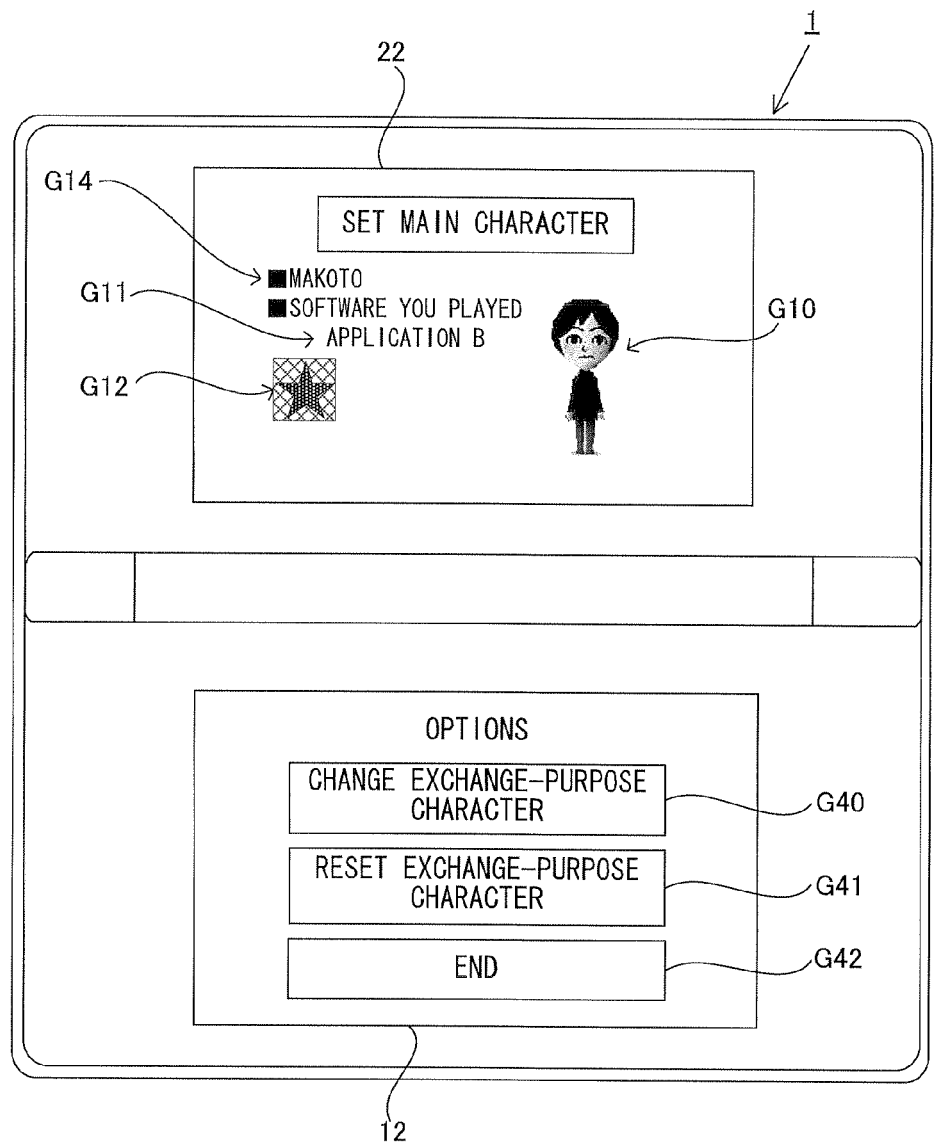
FIG. 19 shows an example of a screen displayed on a lower LCD.

First, the core 31B reads the character information D4 from the portrait character storage area 323, and reads the most-recently-used app ID information D1 from the most-recently-used app ID information storage area 322, and reads the exchange-purpose character ID from the exchange-purpose character ID storage area 324 (S51). Next, the core 31B determines whether an exchange-purpose character ID has been set, based on whether an exchange-purpose character ID has been stored in the exchange-purpose character ID storage area 324 (S52). When determining that an exchange-purpose character ID has not been set (NO at S52), the core 31B performs step S56 which is described below. On the other hand, when determining that an exchange-purpose character ID has been set (YES at S52), the core 31B specifies, among the read character information D4, the character information D4 that is associated with the exchange-purpose character ID which has been set (S53). Thereafter, the core 31B performs a process of generating and displaying a main setting menu screen (S54). The main setting menu screen is, for example, one displayed on the upper LCD 22 as shown in FIG. 19. The main setting menu screen shows: a character image G10 based on the character information D4 specified at step S53; the title G11 and the icon G12 of an application; and a character name G14.

At step S54, the core 31B also performs a process of generating and displaying a screen on the lower LCD 12 as shown in FIG. 19. The screen shows an operation button G40 "CHANGE EXCHANGE-PURPOSE CHARACTER", an operation button G41 "RESET EXCHANGE-PURPOSE CHARACTER", and an operation button G42 "END".

Returning to FIG. 18, the core 31B determines whether an operation of instructing to change the exchange-purpose character has been performed (S55). This operation is, for example, a touch operation of touching the operation button G40 "CHANGE EXCHANGE-PURPOSE CHARACTER". When determining that an operation of instructing to change the exchange-purpose character has been performed (YES at S55), the core 31B performs a process of generating and displaying character images G10 for all the pieces of character information D4 read at step S51 (S56). Here, the lower LCD 12 displays the character images G10. Thereafter, the core 31B repeatedly determines whether an operation of selecting one of the pieces of character information D4 read at step S51 has been performed, until the core 31B determines "YES" (S57). This operation is, for example, a touch operation of touching any one of the character images G10.

When the core 31B determines that an operation of selecting character information D4 has been performed (YES at S57), the core 31B updates the exchange-purpose character ID in the exchange-purpose character ID storage area 324 with the character ID of the selected character information D4, or newly sets the character ID of the selected character information D4 as an exchange-purpose character ID in the exchange-purpose character ID storage area 324 (S58). Also, the core 31B updates, with the selected character information D4, character information D4 stored in a box included in the transmission box 325, in which box the application ID of the out-and-about application is set, or newly sets the selected character information D4 as character information D4 to be stored in the box (S59). Thereafter, the core 31B ends the setting process and returns the processing to step S38 of FIG. 14 to display the out-and-about app main screens.

On the other hand, when the core 31B determines that an operation of instructing to change the exchange-purpose character has not been performed (NO at S55), the core 31B further determines whether an operation of instructing to reset the exchange-purpose character has been performed (S60). This operation is, for example, a touch operation of touching the operation button G41 "RESET EXCHANGE- PURPOSE CHARACTER". When determining that an operation of instructing to reset the exchange-purpose character has been performed (YES at S60), the core 31B deletes the exchange-purpose character ID currently stored in the exchange-purpose character ID storage area 324 (S61). Thereafter, the core 31B ends the setting process and returns the processing to step S38 of FIG. 14 to display the out-and-about app main screens.

On the other hand, when the core 31B determines that an operation of instructing to reset the exchange-purpose character has not been performed (NO at S60), the core 31B further determines whether an operation of instructing to end the setting process has been received (S62). This operation is, for example, a touch operation of touching the operation button G42 "END". When determining that an operation of instructing to end the setting process has not been received (NO at S62), the core 31B returns the processing to step S55. On the other hand, when determining that an operation of instructing to end the setting process has been received (YES at S62), the core 31B ends the setting process and returns the processing to step S38 of FIG. 14.

Figure 20:
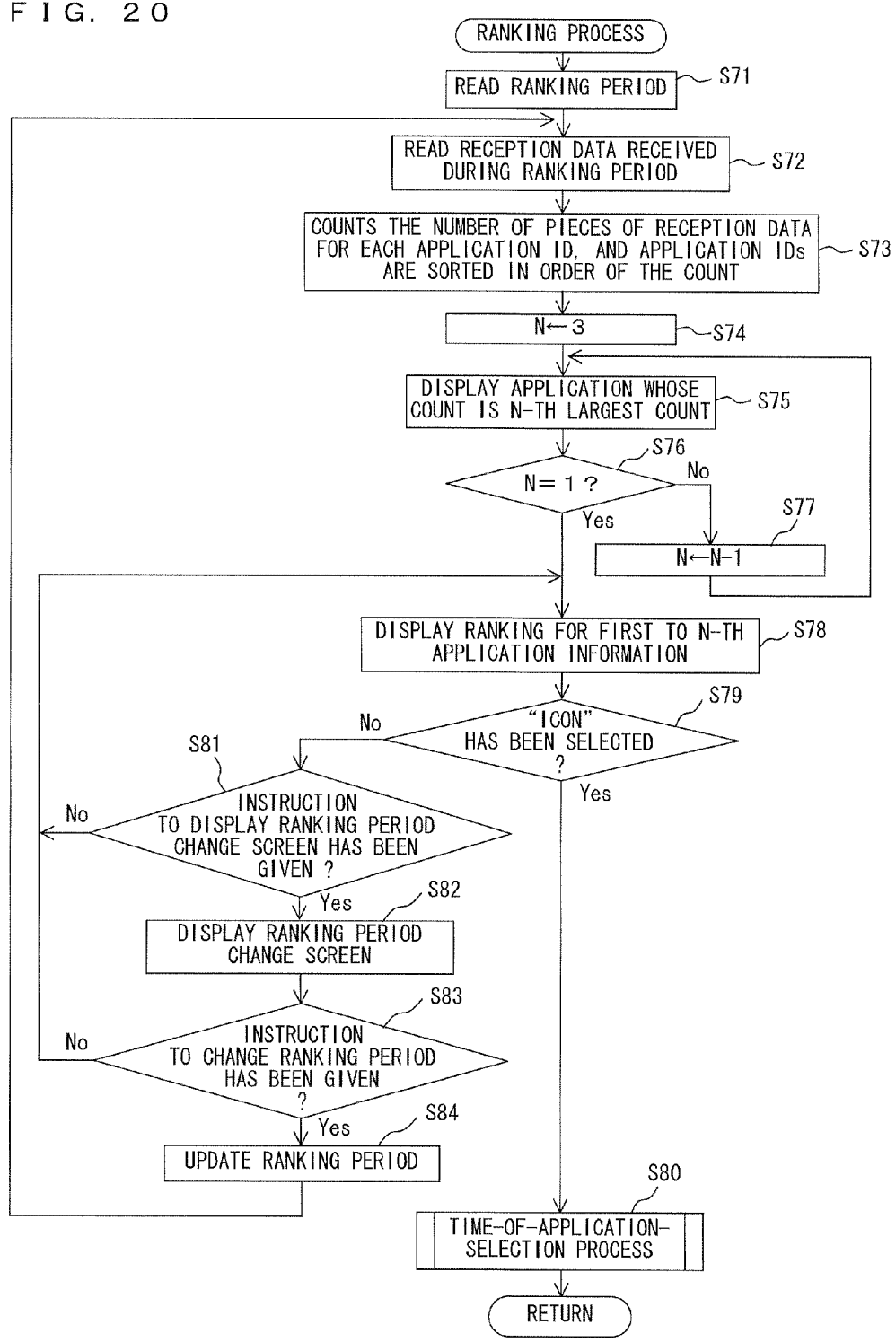
FIG. 20 is a flowchart showing an example of a ranking process.

Hereinafter, the ranking process performed at step S40 of FIG. 14 is described with reference to FIG. 20. FIG. 20 is a flowchart showing an example of the ranking process. First, the core 31B reads, from the ranking period storage area 330, information that indicates a ranking period (S71). Here, if information indicating a ranking period is not set, then a default value (e.g., a "total" value) is set. Then, the core 31B reads, from the reception data storage area 327, pieces of reception data that have been received during the ranking period indicated by the information read at S71 (S72). Whether or not reception data has been received within the ranking period is determined based on the reception time information D5 associated with the reception data. Thereafter, the core 31B counts the number of pieces of reception data that have been read at S72, separately for each application ID contained in the read reception data. Then, the application IDs are sorted in descending order of the count (S73).

Next, the core 31B sets 3 as a parameter N (S74), and performs a process of displaying most-recently-used app ID information D1 and character information D4 that are associated with an application ID whose count is the Nth (i.e., the third) largest count (S75). Note that a value other than 3 may be set as the parameter N. Here, a screen similar to one displayed on the lower LCD 12 as shown in FIG. 5 is displayed, for example. Next, the core 31B determines whether the parameter N is "1" (S76). If the parameter N is not "1" (NO at S76), N-1 is set as the parameter N (S77). Then, the core 31B returns the processing to step S75. In this manner, the display of the most-recently-used app ID information D1 and the character information D4 is sequentially performed for application IDs, from an application ID whose count is the Nth largest count to an application ID whose count is the first largest count.

On the other hand, if the parameter N is "1" (YES at S76), the core 31B displays a ranking screen since the display of the most-recently-used app ID information D1 and the character information D4 has already been performed for the application IDs from the application ID whose count is the Nth largest count to the application ID whose count is the first largest count (S78). The ranking screen displayed here is the same screen as that described above with reference to FIG. 5, and therefore, the detailed description thereof is omitted. As shown in FIG. 5, the lower LCD 12 displays the ranking screen. While the ranking screen is being displayed, the upper LCD 22 displays the most-recently-used app ID information D1 and the character information D4 for an application ID of which the count of the number of pieces of read reception data is the largest.

Next, the core 31B determines whether a touch operation of touching an icon G6 has been performed (S79). When determining that a touch operation of touching an icon G6 has been performed (YES at S79), the core 31B performs a process of downloading, from the server 4, detailed information about an application represented by the touched icon G6 and then displaying the detailed information (hereinafter, referred to as an "time-of-application-selection process") (S80). Thereafter, the core 31B ends the ranking process and returns the processing to step S38 of FIG. 14.

On the other hand, when the core 31B determines that a touch operation of touching an icon G6 has not been performed (NO at S79), the core 31B further determines whether an operation of instructing to display a ranking period change screen has been received (S81). Note that this operation is, for example, touching an operation button G7 "OTHER RANKINGS", which is shown in the ranking screen in FIG. 5.

If an operation of instructing to display a ranking period change screen has not been received (NO at S81), the core 31B returns the processing to step S78. On the other hand, if an operation of instructing to display a ranking period change screen has been received (YES at S81), the core 31B displays a ranking period change screen (S82). The ranking period change screen is a screen as shown in FIG. 21, for example. The screen shows a plurality of operation buttons G30 that represent respective ranking periods that the user can select. The screen also shows an operation button G31 "BACK". Returning to FIG. 20, the core 31B determines whether an operation of changing the ranking period has been performed (S83). This operation is, for example, a touch operation of touching any operation button G30. When determining that an operation of changing the ranking period has been performed (YES at S83), the core 31B updates information that indicates the ranking period and that is stored in the ranking period storage area 330, with information that indicates a new ranking period (S84). Thereafter, the core 31B returns the processing to step S72 and obtains reception data for the new ranking period. This allows the core 31B to update the ranking based on the new ranking period and display the updated ranking.

On the other hand, when the core 31B determines that an operation of changing the ranking period has not been performed and that the operation button G31 "BACK" has been touched (NO at S83), the core 31B returns the processing to step S78.

The above-described ranking process is performed based on all the pieces of reception data received within the ranking period, and the ranking created in this process shows applications in descending order of the number of times of being received during the ranking period (i.e., in descending order of the aforementioned count). However, as an alternative, the ranking process may be performed for pieces of reception data that contain specific character IDs, and a ranking created in this process may show applications in descending order of the number of times of being received (i.e., in descending order of the aforementioned count). This allows the user to be informed of applications that are frequently used by other users represented by characters that the user has selected based on his/her preference. As a further alternative, the user of the game apparatus 1 may be informed of applications that are frequently used by other users whom the user of the game apparatus 1 frequently passes during the ranking period (i.e., applications for which the number of pieces of reception data received during the ranking period is equal to or greater than a predetermined number).

Figure 22:
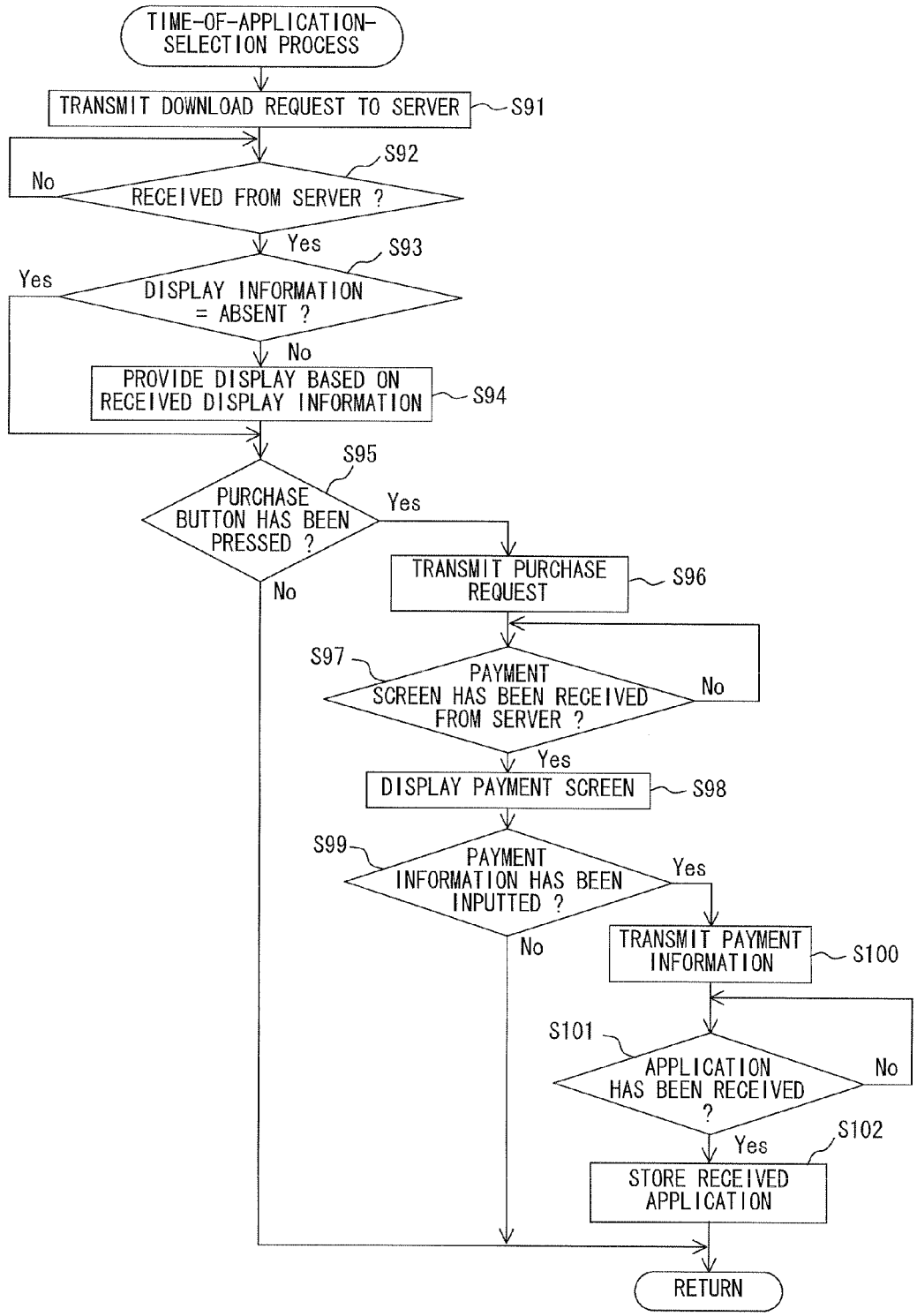
FIG. 22 is a flowchart showing an example of a time-of-application-selection process.

Hereinafter, the time-of-application-selection process performed at step S80 of FIG. 20 is described with reference to FIG. 22. FIG. 22 is a flowchart showing an example of the time-of-application-selection process. First, the core 31B transmits to the server 4 a download request for the aforementioned detailed information (S91). The download request contains an application ID. Thereafter, the core 31B repeatedly determines whether the detailed information has been received from the server 4, until the core 31B determines "YES" (S92). When determining that the detailed information has been received from the server 4 (YES at S92), the core 31B further determines whether the received detailed information indicates absence of display information (S93). When determining that the detailed information indicates presence of display information (NO at S93), the core 31B performs a process of generating and displaying an app introduction screen based on the display information (S94). Then, the processing proceeds to step S95.

On the other hand, when the core 31B determines that the detailed information indicates absence of display information (YES at S93), the core 31B performs, without performing step S94, a process of generating and displaying a screen that indicates absence of detailed information. Then, the processing proceeds to step S95. In the case where an application that is used for purchasing products is different from the out-and-about application (hereinafter, such an application is referred to as a "shopping application"), the core 31B may start the shopping application and display an interface for the user to make a purchase, after ending the execution of the out-and-about application or in parallel with the execution of the out-and-about application if such multitasking is performable.

Here, if a shop server selling the application associated with the application ID transmitted from the core 31B is the server 4, the app introduction screen displayed at step S94 may act as an interface for the user to make a purchase. At step S95, the core 31B determines whether the user has performed, via the interface, an operation to purchase the application (S95). When determining that the user has not performed an operation to purchase the application (NO at S95), the core 31B ends the time-of-application-selection process and the ranking process of FIG. 20, and returns the processing to step S38 of FIG. 14. Note that, also in the case where the app introduction screen displayed at step S94 does not act as an interface for the user to make a purchase, the core 31B determines "NO" at step S95.

On the other hand, when the core 31B determines that the user has performed an operation to purchase the application (YES at S95), the core 31B transmits, to the server 4, a purchase request received through the user's purchase operation (S96). Thereafter, the core 31B repeatedly determines whether payment screen data has been received from the server, until the core 31B determines "YES" (S97). When determining that the payment screen data has been received (YES at S97), the core 31B performs a process of displaying a payment screen based on the received payment screen data (S98). The payment screen acts as an interface for the user to input payment information. The payment information is, for example, a credit card number or a user ID for the service provided by the server 4.

The core 31B determines whether the user has inputted payment information (S99). When determining that the user has not inputted payment information (NO at S99), the core 31B ends the time-of-application-selection process and the ranking process of FIG. 20, and returns the processing to step S38 of FIG. 14. On the other hand, when determining that the user has inputted payment information (YES at S99), the core 31B transmits the inputted payment information to the server 4 (S100). Thereafter, the core 31B repeatedly determines whether application data D2 and app ID information D3 have been received from the server 4, until the core 31B determines "YES" (S101). Then, the core 31B stores these received data in the saved data memory 34 (S102). Thereafter, the core 31B ends the time-of-application-selection process and the ranking process of FIG. 20, and returns the processing to step S38 of FIG. 14.

Figure 23:
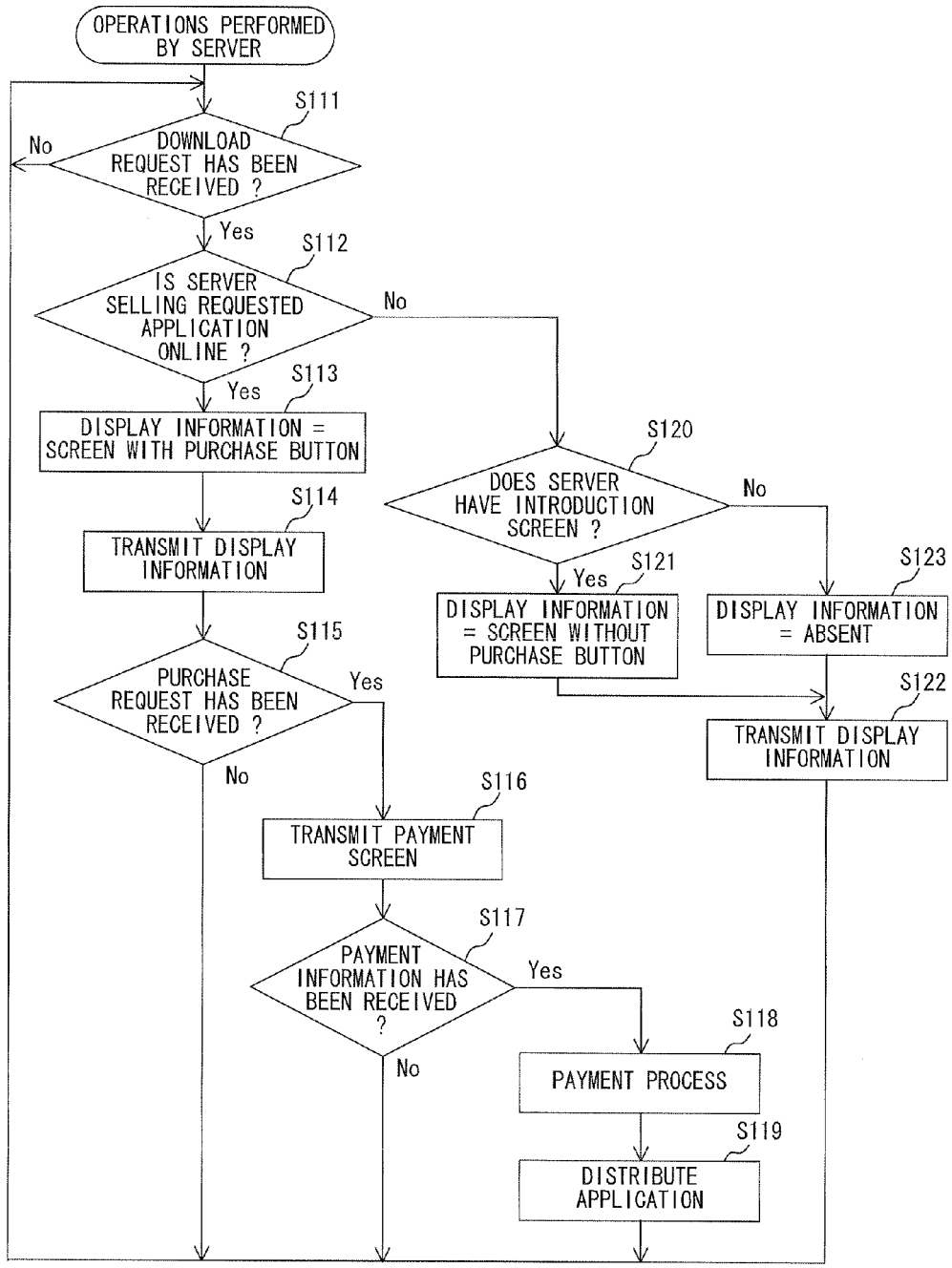
FIG. 23 is a flowchart showing an example of a detailed information distribution process.

Described below with reference to FIG. 23 is processing that is performed by the server 4 for the purpose of distributing the aforementioned detailed information or an application to the game apparatus 1 performing the time-of-application-selection process (hereinafter, referred to as a "detailed information distribution process"). FIG. 23 is a flowchart showing an example of the detailed information distribution process. This process is performed, for example, when the power of the server 4 is turned on or when the server 4 is set to a predetermined mode. First, the CPU 65 repeatedly determines whether a download request for detailed information has been received, until the CPU 65 determines "YES" (S111). Note that the download request received here is a request transmitted from the game apparatus 1 at step 91 of FIG. 22.

Next, the CPU 65 searches the table T for an application ID contained in the received download request, and obtains detailed information associated with the application ID. Also, the CPU 65 refers to online sales information in the table T to determine whether the server 4 is selling the application associated with the application ID (S112). When determining that the server 4 is selling the application (YES at S112), the CPU 65 generates screen data for a screen that shows the obtained detailed information and an operation button for the user to make a purchase of the application (here, the screen data contains purchasing guidance information) (S113). Then, the CPU 65 transmits the screen data to the game apparatus 1 (S114). Note that the screen data in the present embodiment is image data or text data to be displayed on the screen. Thereafter, the CPU 65 determines whether a purchase request has been received within a predetermined period (S115). When determining that a purchase request has not been received within the predetermined period (NO at S115), the CPU 65 returns the processing to step S111. Note that the purchase request is transmitted from the game apparatus 1 when step S96 of FIG. 22 is performed.

On the other hand, when the CPU 65 determines that a purchase request has been received (YES at S115), the CPU 65 reads payment screen data from the RAM 64 and transmits the payment screen data to the game apparatus 1 (S116). Thereafter, the CPU 65 determines whether payment information has been received within a predetermined period (S117). The payment information is transmitted from the game apparatus 1 when step S100 of FIG. 22 is performed. When the CPU 65 determines that payment information has been received (YES at S117), the CPU 65 performs a payment process (S118). The payment process is performed based on, for example, a credit card number. Alternatively, in the case where the server 4 manages the user's points in association with the user's ID, the payment process may be a process of subtracting, from the user's points, points equivalent to the price of the application, for example. Thereafter, the CPU 65 distributes the application to the game apparatus 1 (S119). Then, the processing returns to step S111. When the CPU 65 determines that payment information has not been received within the predetermined period (NO at S117), the CPU 65 returns the processing to step S111.

Described next is a process that the CPU 65 performs when determining that the server 4 is not selling the application (i.e., NO at S112). Here, the CPU 65 determines whether the detailed information about the application is registered in the table T (S120). When determining that the detailed information is registered in the table T (YES at S120), the CPU 65 generates screen data for a screen that shows the detailed information (S121) and transmits the screen data to the game apparatus 1 (S122). Note that the screen does not show an operation button for the user to make a purchase of the application. Thereafter, the CPU 65 returns the processing to step S111.

When the CPU 65 determines that the detailed information about the application is not registered in the table T (NO at S120), the CPU 65 reads, from the RAM 64, information that indicates absence of the detailed information (S123), and transmits the information to the game apparatus 1 (S122). Thereafter, the CPU 65 returns the processing to step S111.

Figure 24:
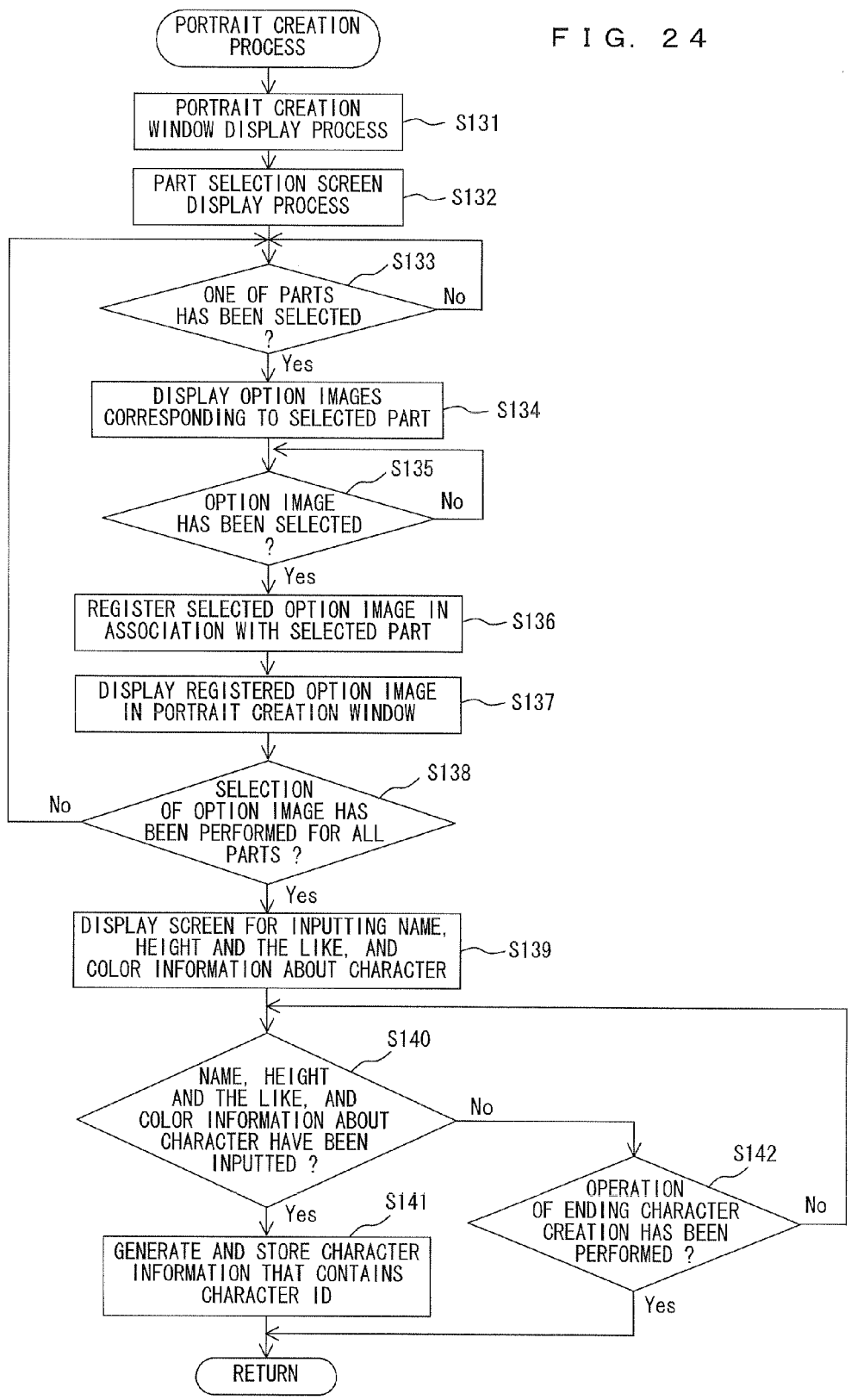
FIG. 24 is a flowchart showing an example of a portrait creation process.
Figure 25:
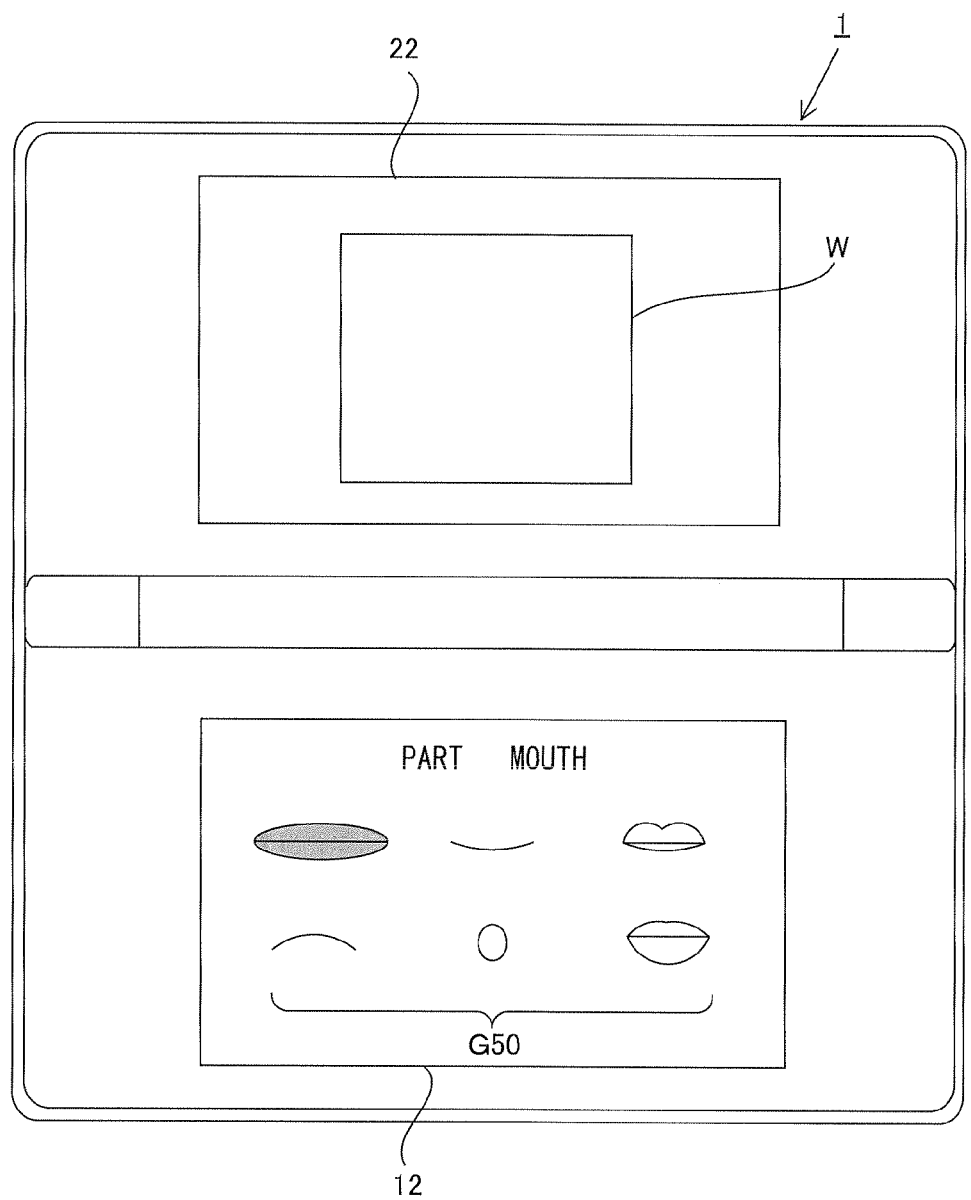
FIG. 25 shows an example of a portrait creation screen.

Described below with reference to FIG. 24 and FIG. 25 is a process that is performed when the portrait application is executed at step S27 of FIG. 13 (hereinafter, referred to as a "portrait creation process"). The portrait application is an application for generating character information D4. FIG. 24 is a flowchart showing an example of the portrait creation process. First, the core 31B performs a process of generating and displaying a portrait creation window W on the upper LCD 22 (S131). Then, the core 31B performs a process of generating a part selection screen for the user to select a part among parts such as eyes, nose, mouth, outline, hair, and the like, and displaying the part selection screen on the lower LCD 12 (S132).

Thereafter, the core 31B repeatedly determines whether an operation of selecting one of the parts has been performed, until the core 31B determines "YES" (S133). This operation is, for example, a touch operation of touching one of the parts shown in the part selection screen displayed on the lower LCD 12. When determining that an operation of selecting one of the parts has been performed (YES at S133), the core 31B performs a process of displaying on the lower LCD 12 a portrait creation screen which shows a plurality of option images G50 that correspond to the selected part (S134). The option images G50 are images of eyes when a part "eyes" is selected, for example. FIG. 25 shows an example of the portrait creation screen that is displayed when one of the parts has been selected. Here, the upper LCD 22 displays an upper portrait creation screen which shows the portrait creation window W, and the lower LCD 12 displays a lower portrait creation screen which shows option images G50. Then, the core 31B repeatedly determines whether an operation of selecting one of the option images G50 has been performed, until the core 31B determines "YES" (S135). Here, the user may be allowed to perform minor adjustments on the position or angle of the selected option image G50.

When the core 31B determines that an operation of selecting an option image G50 has been performed (YES at S135), the core 31B registers, in the main memory 32, the ID of the selected option image G50 in association with a part ID of the selected part (S136). Thereafter, the core 31B performs a process of displaying, in the portrait creation window W, the option image G50 of which the ID is registered in the main memory 32 (S137). Next, the core 31B determines whether an operation of selecting an option image G50 has been performed for all the parts (S138). When determining that an operation of selecting an option image G50 has not yet been performed for all the parts (NO at S138), the core 31B returns the processing to step S133. When determining that an operation of selecting an option image G50 has been performed for all the parts (YES at S138), the core 31B performs a process of displaying, for example in the lower LCD 12, a screen for the user to input the name, height (i.e., how tall), physical attribute (i.e., how thick), and color information about a character (S139).

Next, the core 31B determines whether the name, height (i.e., how tall), physical attribute (i.e., how thick), and color information about a character have been fixedly inputted (S140). When determining that these types of information have been fixedly inputted (YES at S140), the core 31B generates character image information that indicates the IDs of the selected option images G50 and the part IDs corresponding thereto. Then, the core 31B generates character information D4 as shown in FIG. 8B that contains color information, height/physical attribute information, character name, character ID, and character image information, and stores the character information D4 in the portrait character storage area 323 (S141).

On the other hand, when the core 31B determines that the aforementioned types of information have not been fixedly inputted (NO at S140), the core 31B determines whether an operation of ending the character creation has been performed (S142). When determining that an operation of ending the character creation has not been performed (NO at S142), the core 31B returns the processing to step S140. On the other hand, when determining that an operation of ending the character creation has been performed (YES at S142), the core 31B ends the portrait creation process.

The character information D4 generated in this manner based on the user's operations shows the characteristics of the user. The game apparatus 1 and the other game apparatus 1 transmit to/receive from each other character information D4 that shows the characteristics of the users of the game apparatus 1 and the other game apparatus 1, together with most-recently-used app ID information D1. Therefore, the user of each game apparatus 1 can know the characteristics of the other user as well as an application used by the other user.

As described above, in the present embodiment, the game apparatus 1 can receive most-recently-used app ID information D1 from other game apparatuses 1. This allows the game apparatus 1 to obtain, from specific game apparatuses 1, information that identifies applications executed by the specific game apparatuses 1 (i.e., most-recently-used app ID information D1). This allows the user of the game apparatus 1 to know applications executed by other game apparatuses 1 that are closely related to the status of the user's usage of the game apparatus 1.

To be specific, in the present embodiment, the game apparatus 1 obtains most-recently-used app ID information D1 from other game apparatuses 1 by means of the passing communication. This allows the user of the game apparatus 1 to know applications executed by the other game apparatuses 1, which are located within a predetermined distance range from the game apparatus 1. Accordingly, the user can know the status of usage of applications by other users located nearby (i.e., located within a short distance from the user).

Since the game apparatus 1 is a handheld game apparatus, the user carries it. Therefore, the user can obtain, wherever the user goes, identification information about other game apparatuses 1 that are located within a short distance from the user's game apparatus 1. This allows the user to know the status of usage of applications by other users whose area of activities is similar to that of the user.

Hereinafter, variations of the present embodiment are described.

(1) In the present embodiment, at step S112 of FIG. 23, the server 4 performs a process of determining whether or not an application for which the detailed information is obtained can be downloaded from the server 4. However, as an alternative, the game apparatus 1 may perform such determination process. If the application can be downloaded from the server 4, the game apparatus 1 may request data of a purchase order screen that allows the user to make a purchase of the application.

(2) Further, in the present embodiment, in the time-of-application-selection process of FIG. 22, the game apparatus 1 downloads and thereby obtains detailed information about an application from the server 4. However, as an alternative, the detailed information may be prestored in the saved data memory 34 of the game apparatus 1. For example, the game apparatus 1 may collectively download, from the server 4 at a frequency of once a week, entire detailed information managed by the server 4, and store the downloaded detailed information in the saved data memory 34. As a further alternative, the detailed information may be contained in the application data D2 of the out-and-about application.

(3) Still further, in the present embodiment, the game apparatus 1 is configured to store and update only one piece of most-recently-used app ID information D1. However, as an alternative, the game apparatus 1 may be configured to store a predetermined number (two or more) of pieces of most-recently-used app ID information D1 and transmit all the stored most-recently-used app ID information D1 to another game apparatus 1. In other words, the game apparatus 1 may transmit application information about applications that have most recently been executed in the predetermined number of times of application executions.

(4) Although the game apparatus 1 transmits character information D4 together with most-recently-used app ID information D1, the game apparatus 1 may be configured to transmit only most-recently-used app ID information D1.

(5) In the present embodiment, the game apparatus 1 updates most-recently-used app ID information D1 at the start of application execution. However, the game apparatus 1 may perform the update after the application execution has been completed.

(6) Further, in the present embodiment, the game apparatus 1 is configured to transmit most-recently-used app ID information D1 that identifies an application executed by the game apparatus 1, to another game apparatus 1. However, the present invention is not limited thereto. Thus, for example, the game apparatus 1 may be configured to transmit to/receive from another game apparatus 1 information that identifies image data or audio data reproduced by the game apparatus 1 and the other game apparatus 1 (e.g., thumbnail images for the image data) in addition to or in place of information about applications executed by the game apparatus 1 and the other game apparatus 1. Note that the term "content data" herein refers not only to applications but also to image data, audio data, and the like.

(7) Still further, in the present embodiment, the transmission/reception of most-recently-used app ID information D1 among a plurality of game apparatuses 1 is performed by the passing communication. However, the present invention is not limited thereto. Thus, for example, the game apparatus 1 may be configured to transmit most-recently-used app ID information D1 not automatically but when receiving from the user an instruction to transmit the most-recently-used app ID information D1. Further, the game apparatus 1 may transmit/receive most-recently-used app ID information D1 to/from another game apparatus 1 by means of wired or wireless communication such as the Internet, infrared communication, or a different type of short-distance communication. Note that if the game apparatus 1 is configured to transmit to/receive from other game apparatuses 1 most-recently-used app ID information D1 by means of the Internet or the like, then the game apparatus 1 may be configured to communicate only with other game apparatuses 1 that are registered, by the user of the game apparatus 1, as friends (i.e., as communication recipients). In such a case, the communication recipients are limited to the game apparatuses 1 which the user of the game apparatus 1 already knows. This allows the user of the game apparatus 1 to know applications that are used by other users who have a close relationship with the user of the game apparatus 1.

(8) Still further, in the present embodiment, only one exchange-purpose character ID can be set for the game apparatus 1, and the game apparatus 1 can transmit only one piece of character information D4 to another game apparatus 1. However, as an alternative, a plurality of exchange-purpose character IDs may be set for the game apparatus 1, and a plurality of pieces of character information D4 that are associated with the plurality of exchange-purpose character IDs, respectively, may be transmitted. As a further alternative, an exchange-purpose character ID is not set for the game apparatus 1, and the game apparatus 1 may transmit all the character information D4 stored therein to another game apparatus 1. Note that a flag that indicates whether or not a character indicated by character information D4 is an exchange-purpose character may be registered for each piece of character information D4, and only the character information D4 for which the flag indicates that the character is an exchange-purpose character may be transmitted to another game apparatus 1.

(9) Still further, in the present embodiment, the passing communication process is performed so long as the power of the game apparatus 1 is ON. However, the present invention is not limited thereto. Thus, for example, the passing communication process may be performed only when the game apparatus 1 is set to a passing communication mode or when a predetermined condition is satisfied and the power of the game apparatus 1 is ON.

(10) Still further, in the present embodiment, the present invention is applied to the game apparatus 1. However, the present invention is applicable not only to a game apparatus but also to, for example, a portable information terminal apparatus such as a mobile phone, a personal handyphone system (PHS), or a personal digital assistant (PDA). The present invention is also applicable to a stationary game apparatus, a personal computer, or the like.

(11) Still further, in the present embodiment, the game apparatus 1 is capable of receiving the same reception data from the same source (i.e., from the same game apparatus 1) a plurality of times, and cumulatively storing the same reception data a plurality of times. However, as an alternative, the game apparatus 1 may be configured not to receive reception data from the same source a plurality of times. As a further alternative, the game apparatus 1 may be configured not to receive or cumulatively store reception data if the source MAC address of, or the character information D4 contained in, the reception data coincides with that of previously stored reception data. As a still further alternative, the game apparatus 1 may be configured not to receive or cumulatively store reception data if the source of, and the most-recently-used app ID information D1 contained in, the reception data coincide with those of previously stored reception data. Note that an advantage of being capable of cumulatively storing reception data that is received from the same source a plurality of times is that a large number of pieces of most-recently-used app ID information D1 to be used for creating a ranking can be obtained, and that a sufficient number of pieces of most-recently-used app ID information D1 to be used for creating a ranking can be obtained even in an area where the number of users of game apparatuses 1 is small. Another advantage of being capable of cumulatively storing reception data that is received from the same source a plurality of times is that the user of the game apparatus 1 can obtain, by the game apparatus 1, useful information that the passing communication has been performed with another game apparatus 1 a plurality of times. On the other hand, in the case where the game apparatus 1 is configured not to cumulatively store reception data if the source of, or the character information D4 contained in, the reception data coincides with that of previously stored reception data, a situation where the same most-recently-used app ID information D1 is repeatedly received from the same user, which is unnecessary, is prevented.

(12) Still further, in the present embodiment, the above-described processing is performed with the single server 4. However, a plurality of servers may be used to realize the above-described processing. For example, one server may perform processing for providing detailed information to the game apparatus 1; another server may perform processing for causing the game apparatus 1 to display a payment screen (i.e., payment-related information); and still another server may distribute, to the game apparatus 1, an application that has been purchased through the payment process. Still further, in the present embodiment, the above-described processing is performed with the single game apparatus 1. However, a plurality of game apparatuses 1 may be used to realize the above-described processing.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having an information processing program stored therein, the information processing program, when executed, causing a computer of a first information processing apparatus of a first user that includes a storage section, to perform operations comprising:
generating transmission data that includes respective identification information of one or more items of content data that is being executed, or of one or more items of content data that has been executed;
transmitting the transmission data to a second information processing apparatus of a second user;
receiving, from the second information processing apparatus, respective identification information of one or more items of content data executed by the second information processing apparatus;
automatically and cumulatively storing the received respective identification information of the items of content data in the storage section as cumulative data; and
outputting some or all of the received respective identification information.

2. The computer-readable storage medium according to claim 1, wherein the program, when executed, causes the computer to perform further operations comprising
automatically transmitting the transmission data, and
automatically receiving the respective identification information of the items of content data executed by the second information processing apparatus.

3. The computer-readable storage medium according to claim 2, wherein the program, when executed, causes the computer to perform further operations comprising
automatically repeating transmitting the transmission data, and
automatically repeating receiving of the respective identification information of the items of content data executed by the second information processing apparatus.

4. The computer-readable storage medium according to claim 1, wherein
the first information processing apparatus is a handheld terminal apparatus,
the information processing program causes the computer to perform further operations comprising repeatedly searching, by short-distance wireless communication, for another information processing apparatus of another user that is to become a communication recipient of the first information processing apparatus and that is present within a distance range from the first information processing apparatus, the distance range allowing the first information processing apparatus to perform the short-distance wireless communication with the other information processing apparatus, and automatically establishing a connection of the short-distance wireless communication with the other information processing apparatus,
automatically transmitting, by the short-distance wireless communication, the transmission data to the other information processing apparatus, which is the communication recipient, and
automatically receiving, by the short-distance wireless communication, the respective identification information from the other information processing apparatus, which is the communication recipient.

5. The computer-readable storage medium according to claim 1, wherein
the information processing program causes the computer to perform further operations comprising:
automatically transmitting a connection request at a predetermined timing to the second information processing apparatus;
receiving a connection request from the second information processing apparatus;
transmitting a connection response to the second information processing apparatus when the connection request transmitted from the second information processing apparatus has been received; and
receiving a connection response transmitted from the second information processing apparatus, and
the transmission data is transmitted to the second information processing apparatus when the connection response is transmitted to the second information processing apparatus or when the connection response is received from the second information processing apparatus.

6. The computer-readable storage medium according to claim 5, wherein
the generated transmission data is transmitted, when the respective identification information from the second information processing apparatus has been received.

7. The computer-readable storage medium according to claim 1, wherein
the transmission data is transmitted to the second information processing apparatus by short-distance wireless communication, and the respective identification information is received from the second information processing apparatus by short-distance wireless communication.

8. The computer-readable storage medium according to claim 1, wherein
the storage section is configured to store transmission data up to a predetermined amount,
the transmission data stored in the storage section is transmitted to the second information processing apparatus, and
the information processing program causes the computer to perform further operations comprising updating data in the storage section when the transmission data is newly generated, such that the predetermined amount of the transmission data stored in the storage section, which contains the newly generated transmission data, are arranged in reverse chronological order of generation.

9. The computer-readable storage medium according to claim 1, wherein information is output that is based on the number of respective identification information contained in the cumulative data.

10. The computer-readable storage medium according to claim 9, wherein
the information processing program causes the computer to perform further operations comprising counting, among the respective identification information contained in the cumulative data, the number of respective identification information that satisfy a predetermined condition, and
outputting a counting result obtained from the counting.

11. The computer-readable storage medium according to claim 1, wherein
the information processing program causes the computer to perform further operations comprising:
receiving, from the first user of the first information processing apparatus, a selection operation of selecting identification information from among the output identification information;
obtaining, when the selection operation is received, detailed information about the item of content data that is associated with the identification information selected by the selection operation; and
outputting the obtained detailed information.

12. The computer-readable storage medium according to claim 11, wherein the detailed information is obtained from a server.

13. The computer-readable storage medium according to claim 10, wherein
the outputting outputs, as the counting result, the counted number of respective identification information, and the identification information, and
the information processing program causes the computer to perform further operations comprising:
receiving, from the first user of the first information processing apparatus, a selection operation of selecting identification information from among the output identification information;
obtaining, when the selection operation is received, detailed information about the item of content data that is associated with the identification information selected by the selection operation; and
outputting the obtained detailed information.

14. The computer-readable storage medium according to claim 1, wherein
the information processing program causes the computer to perform further operations comprising:
receiving, from the first user of the first information processing apparatus, a selection operation of selecting identification information from among the outputted identification information;
obtaining, when the selection operation is received, purchasing guidance information for allowing the first user to purchase the item of content data that is associated with the identification information selected by the selection operation; and
outputting the obtained purchasing guidance information.

15. The computer-readable storage medium according to claim 14, wherein
the information processing program causes the computer to perform further operations comprising
a predetermined transaction process with a server for purchasing items of content data from the server, and
when the selection operation is received, obtaining, from the server, the purchasing guidance information for the item of content data which is associated with the identification information selected by the selection operation.

16. The computer-readable storage medium according to claim 14, wherein
the purchasing guidance information is obtained by receiving, from a server as the purchasing guidance information, information that provides a guide for the first user to perform a purchase operation of purchasing the item of content data, and
the information processing program causes the computer to perform further operations comprising:
receiving the purchase operation which the first user performs in accordance with the guide of the purchasing guidance information;
transmitting, when the purchase operation is received, a purchase request for the items of content data to the server; and
receiving from the server the item of content data which has been purchased.

17. The computer-readable storage medium according to claim 1, wherein
the information processing program causes the computer to perform further operations comprising:
receiving, from the first user of the information processing apparatus, a selection operation of selecting identification information from among the outputted identification information;
transmitting, to a server, the identification information selected by the selection operation;
receiving, from the server, detailed information about the item of content data associated with the identification information selected by the selection operation, and/or purchasing guidance information for purchasing the item of content data; and
outputting the received detailed information and/or the received purchasing guidance information.

18. The computer-readable storage medium according to claim 1, wherein
the identification information comprises data of an icon that visually indicates the content data, and
data for displaying the icon is output, based on the data of the icon.

19. The computer-readable storage medium according to claim 1, wherein
the storage section stores at least one piece of character information, the transmission data is generated such that the transmission data comprises the at least one piece of character information and the respective identification information, and a character image is generated from character information that is contained in data received from the second information processing apparatus, and the character image is output together with respective identification information contained in the received data.

20. The computer-readable storage medium according to claim 19, wherein the information processing program causes the computer to perform further operations comprising:

receiving a generation operation that the first user of the first information processing apparatus performs for generating character information, and generating, when the generation operation is received, the character information in accordance with the generation operation, and storing the character information in the storage section.

21. The computer-readable storage medium according to claim 1, wherein the information processing program causes the computer to perform further operations comprising:

imposing, for a first predetermined period after the respective identification information is received and/or for a second predetermined period after the transmission data is transmitted, a prohibition of further reception of the respective identification information from the second information processing apparatus which is the source of the respective identification information that has been received and/or a prohibition of further transmission of the transmission data to the second information processing apparatus which is the destination of the transmission data that has been transmitted, and one or both of:

removing, after the first predetermined period has elapsed, the prohibition of further reception of the respective identification information from the second information processing apparatus which is the source of the identification information that has been received and/or the prohibition of further transmission of the transmission data to the second information processing apparatus which is the destination of the transmission data that has been transmitted; and removing, after the second predetermined period has elapsed, the prohibition of further reception of the respective identification information from the second information processing apparatus which is the source of the identification information that has been received and/or the prohibition of further transmission of the transmission data to the second information processing apparatus which is the destination of the transmission data that has been transmitted.

22. An information processing apparatus for a first user comprising:

a storage section;

content data execution means for executing content data;

transmission data generation means for generating transmission data that includes respective identification information of one or more items of content data executed by the content data execution means;

transmitting means for transmitting the transmission data to an information processing apparatus of a second user;

receiving means for receiving, from the information processing apparatus of the second user, respective identification information of one or more items of content data executed by the information processing apparatus of the second user, wherein the receiving means automatically and cumulatively stores the received respective identification information of the items of content data in the storage section;

output means for outputting some or all of the respective identification information received by the receiving means.

23. An information processing system for a first user comprising:

a storage section for storing content data; and a processor configured to:

execute content data;

generate transmission data that includes respective identification information of items of executed content data;

transmit the transmission data to an information processing apparatus of a second user;

receive, from the information processing apparatus of the second user, respective identification information of one or more items of content data executed by the information processing apparatus of the second user;

automatically and cumulatively store the received respective identification information of the items of content data in the storage section; and output some or all of the received respective identification information.

24. An information processing method comprising:

generating, by an information processing apparatus of a first user, transmission data that includes respective identification information of one or more items of executed content data;

transmitting, by the information processing apparatus of the first user, the transmission data to an information processing apparatus of a second user;

receiving, by the information processing apparatus of the first user, from the information processing apparatus of the second user, respective identification information of one or more items of content data executed by the information processing apparatus of the second user;

automatically and cumulatively storing, by the information processing apparatus of the first user, the received respective identification information of the items of content data in a storage section of the information processing apparatus of the first user; and outputting, by the information processing apparatus of the first user, some or all of the received respective identification information.

25. A portable information processing apparatus of a first user comprising:

a communication module configured for short-distance wireless communication;

one or more displays;

a processing arrangement for accessing memory storing a communication program and executing the communication program so as to perform operations comprising:

generating respective identification information for each of one or more applications recently used by the portable information processing apparatus;

transmitting, in cooperation with the communication module, the respective identification information to one or more other apparatuses of other users;

receiving from the one or more other apparatuses of the other users, in cooperation with the communication module, respective identification information for one or more applications recently used by the one or more other apparatuses of the other users;

cumulatively storing the received respective identification information; and generating, for the one or more displays, image data based on the received identification information.

26. The portable information processing apparatus according to claim 25, wherein the memory is part of the portable information processing apparatus of the first user.

27. The portable information processing apparatus according to claim 25, wherein the other apparatuses of the other users each comprises a portable information processing apparatus.

28. The portable information processing apparatus according to claim 25, wherein the processing arrangement executes the communication program to perform further operations comprising:

accessing an information source using received identification information to obtain detailed information about a corresponding application; and generating, for the one or more displays, image data based on the detailed information.

29. The portable information processing apparatus according to claim 28, wherein the received identification information for an application includes title information and icon-related information.

30. The portable information processing apparatus according to claim 25, embodied as a mobile phone.

31. The portable information processing apparatus according to claim 25, wherein the image data comprises data indicative of the number of times identification information corresponding to a particular application is received.

* * * * *